United States Patent [19]
Heskett

[11] 3,831,754
[45] Aug. 27, 1974

[54] FLUID TREATING APPARATUS

[75] Inventor: Don Edward Heskett, Villa Park, Ill.

[73] Assignee: Morton-Norwich Products, Inc., Chicago, Ill.

[22] Filed: Aug. 16, 1971

[21] Appl. No.: 171,852

[52] U.S. Cl.............. 210/80, 210/82, 210/96, 210/105, 210/190, 210/282, B01d/27/12
[51] Int. Cl............................................ B01d 15/06
[58] Field of Search.......... 210/80, 86, 82, 91, 103, 210/105, 148, 190, 282, 289, 96

[56] References Cited
UNITED STATES PATENTS

| | | | |
|---|---|---|---|
| 2,136,660 | 11/1938 | Martin | 210/80 |
| 3,266,628 | 8/1966 | Price | 210/282 X |
| 3,286,838 | 11/1966 | Jones | 210/282 X |
| 3,323,649 | 6/1967 | Rosaen | 210/91 X |
| 3,538,020 | 3/1970 | Heskett et al. | 210/510 X |
| 3,574,330 | 4/1971 | Prosser | 210/96 |

*Primary Examiner*—John Adee
*Attorney, Agent, or Firm*—Lockwood, Dewey, Zickert & Alex

[57] ABSTRACT

A fluid treating apparatus having a treating cartridge of an active treating material, such as an ion exchange material, which undergoes dimension change upon reduction of its treating capacity as well as upon regeneration of the capacity thereof, a regenerant source (e.g. brine) for regenerating the ion exchange resin, and a dimension sensing mechanism which also operates flow control valves within the apparatus so that the cartridge is regenerated as required by flowing brine or other regenerative material through the cartridge, after which the apparatus automatically returns to its original state. In one described embodiment, the operation of all valves is completely hydraulic and in another embodiment the flow control valves are operated electromechanically. In one embodiment, the apparatus is arranged so that the cartridge dimension is sensed only when fluid flow through the cartridge is interrupted so that regeneration will not occur during use; fluid bypasses the cartridge during regeneration so that flow is not interrupted unintentionally. The active treating material, in a preferred embodiment, is very fine mesh material bound into a cartridge to provide the system with an extremely high rate of exchange.

39 Claims, 13 Drawing Figures

INVENTOR
DON EDWARD HESKETT

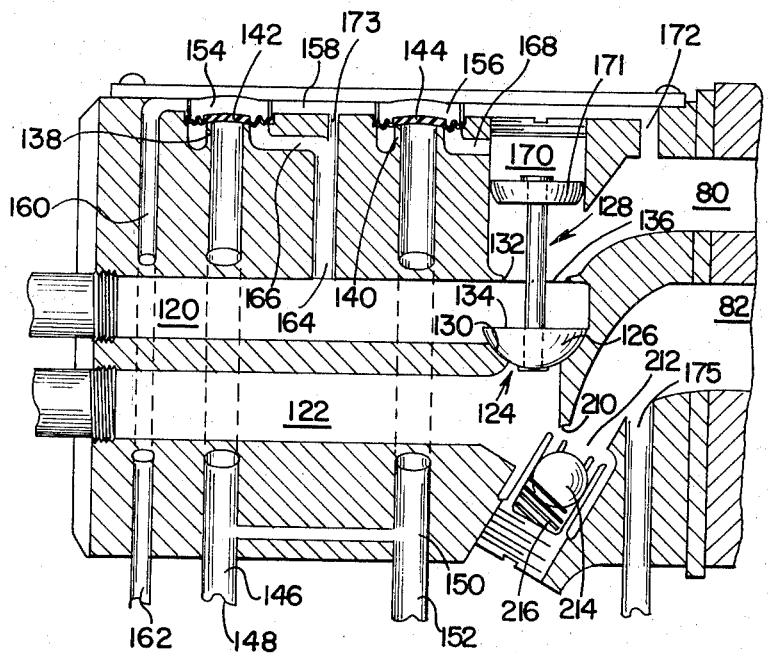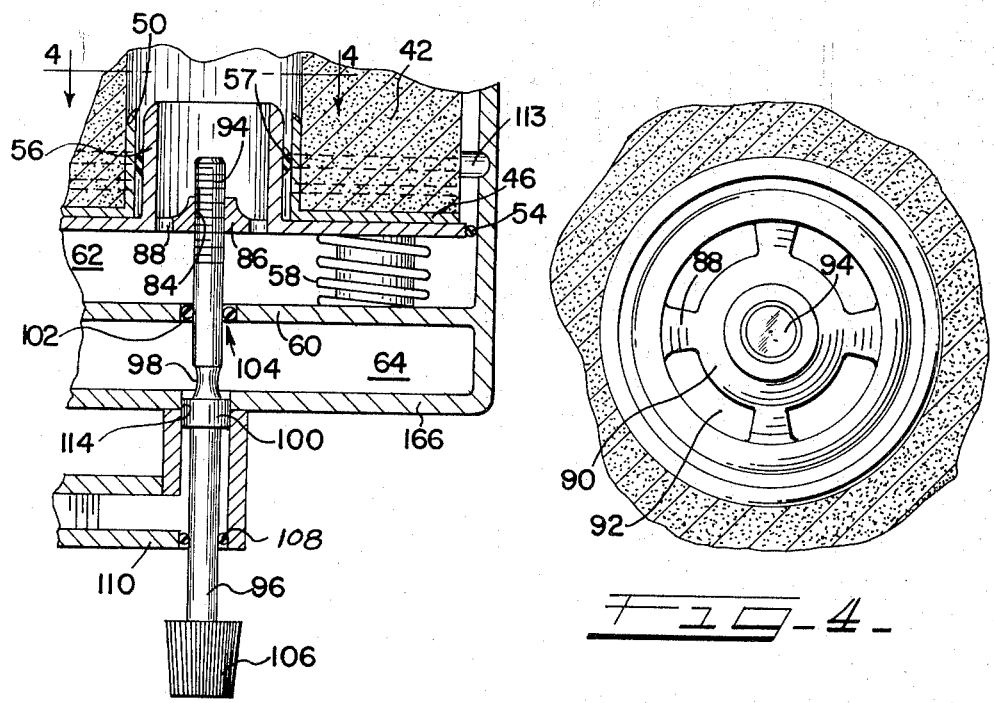

INVENTOR
DON EDWARD HESKETT
ATT'YS

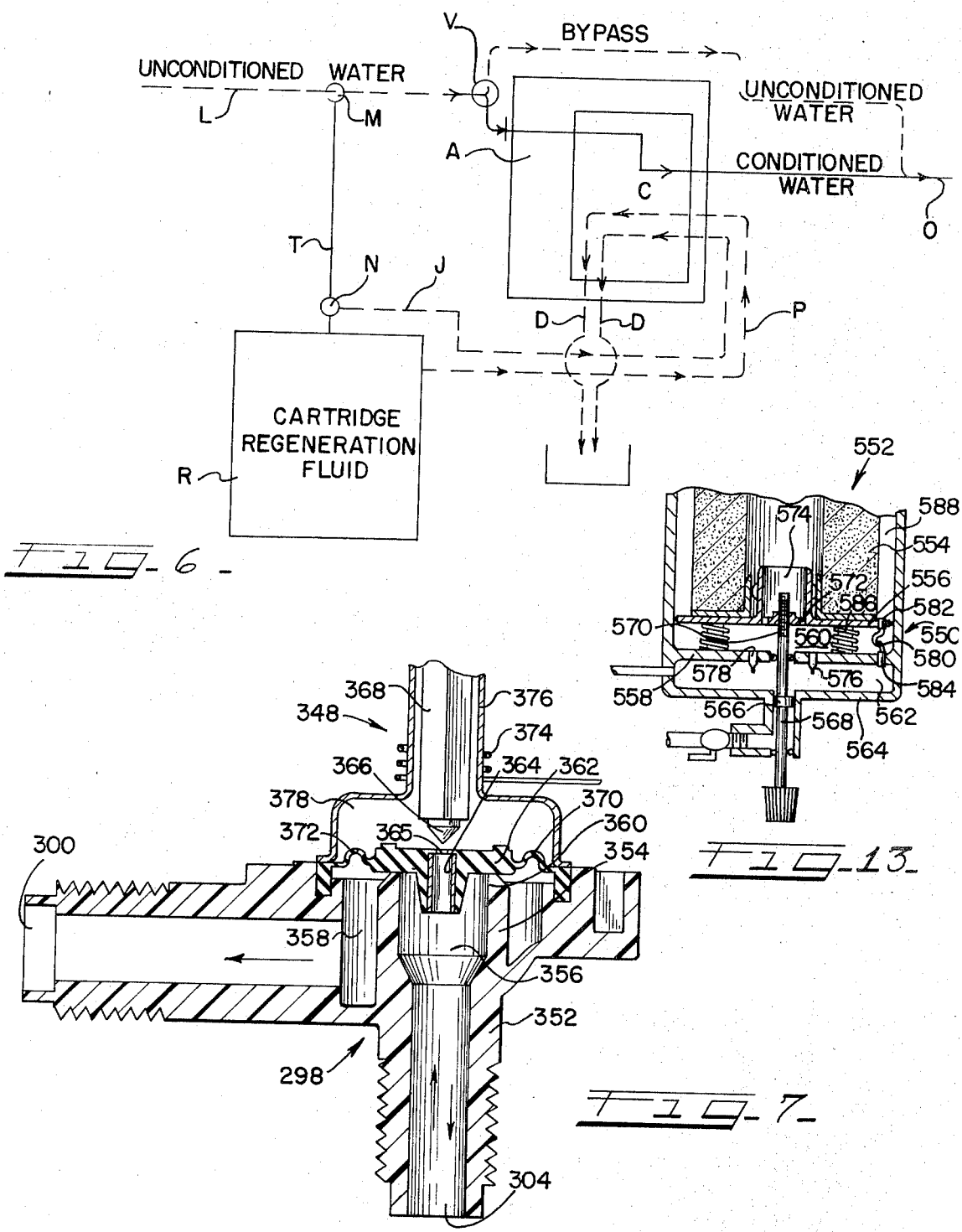

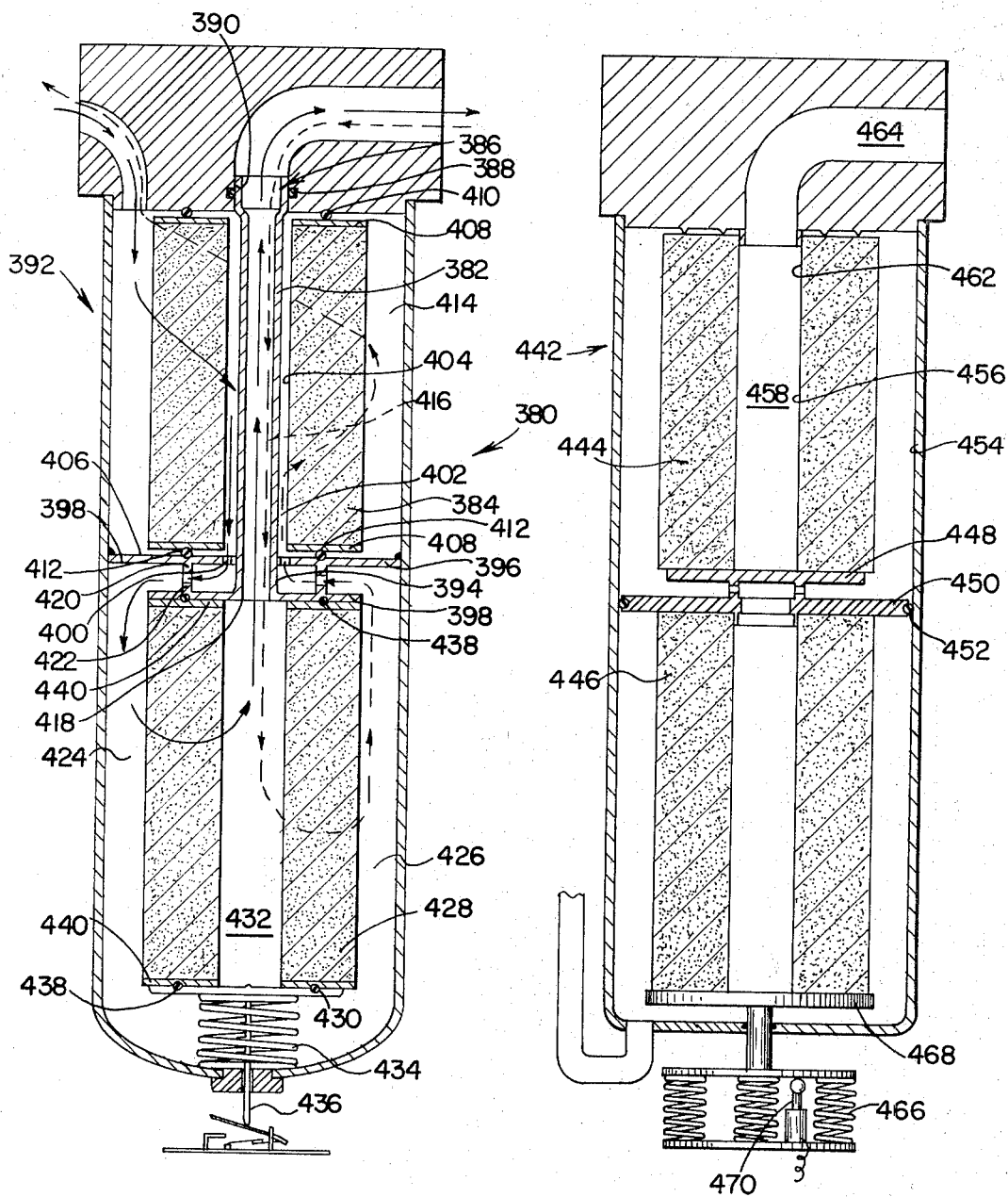

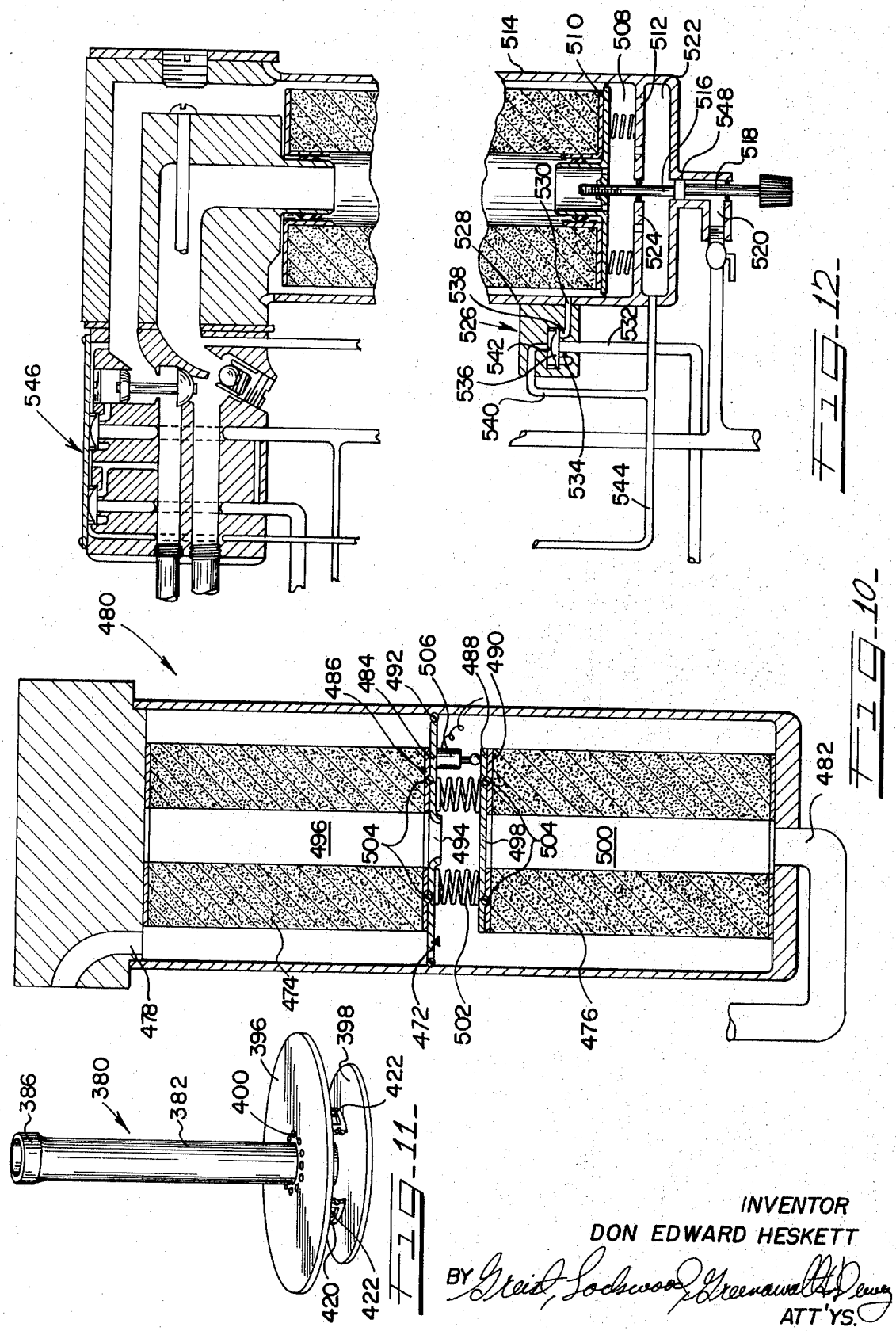

FLUID TREATING APPARATUS

BACKGROUND AND DESCRIPTION OF THE INVENTION

The present invention relates generally to apparatus for treating fluids and particularly to water treating apparatus such as water softeners, demineralizers, apparatus for removing undesirable flavor and color from water or other fluids or the like.

Referring to one important use of the invention, namely, water softening, it is known that water softeners for domestic use are normally used under conditions of intermittent rather than continuous water flow, that is, water is drawn through the treating system for a given time, such as the time required for filling a washing machine, dishwasher, or the like, or is periodically withdrawn for cooking or drinking purposes or the like. Accordingly, it is normal to operate water faucets for intermittent periods of varying length. Commercially available home use or light industrial water softeners generally fall into two categories, namely, those in which the entire softener unit is periodically removed and replaced with a new unit in which the active material is regenerated at a site remote from the home or other place of installation. In such a case, replacement of the unit is carried on at scheduled intervals which may or may not correspond with the amount of use the unit has undergone and, accordingly, it is common that regularly scheduled replacement occurs too early or too late for maximum consumer satisfaction and economy.

Other typical water softeners are of a type in which the user himself regenerates the spent active material according to a given procedure. In use, after the water is observed to display increased hardness, which may be noticed by symptoms of soap scum formation or the like, the use of water is temporarily discontinued, or the water treating apparatus is bypassed, while the treating aggregate is backwashed with salt water, and then rinsed, whereupon the ion exchange material is tpically reconverted to the sodium form thereof. Thereafter, the user again effectively places the treating apparatus in the water service line for subsequent use until the treating capacity of the ion exchange material is again depleted and so on. Regeneration and rinsing typically require an hour or more.

In connection with systems of the type just described, it has been appreciated that it would be desirable to have an apparatus which could be regenerated in the home but in which the regeneration would take place automatically.

Systems such as this have been designed and produced commercially. Normally, the regeneration cycle of such apparatuses is initiated by a timer or like fixed-interval mechanism. Other water softeners include relatively complex electromechanical or like hardness detectors which indicate when regeneration is needed but which are complex and costly, and in some cases, sensitive and unreliable in extended use. Units have been proposed in which the dimension of a sample or control loose ion exchange bed is detected as a control to indicate the approximate time at which regeneration should occur. However, in such apparatus, it is the dimension of a control rather than the entire fluid treating bed as a whole, which is detected and since there is virtually never exact correspondence between flow conditions in the sampling portion of the apparatus and in the treating portion of the apparatus, these devices depend for accurate operation on the assumption that these conditions correspond closely to each other which is commonly an erroneous assumption. This is particularly true in view of the fact that flow through loose beds of treating material is somewhat random and that loose beds tend to compact and become clogged with use. Likewise, loose beds must, by necessity, employ larger particle size fluid treating aggregates which, due to their surface area for a given unit of volume, are characterized by a reduced rate of exchange for such unit of volume. This reduced rate of exchange results in slower flow rates through the softener unit for achieving a desired degree of hardness removal as well as a correspondingly slower rate of regeneration for the ion exchange resin.

Furthermore, systems which detect the dimensions of the loose bed sampling material normally also utilize intermediate means, such as electromechanical switches, relays, etc. to actuate the valves in the sequence necessary to bring about regeneration. As such, these systems may be complex and could tend toward unreliable operations. In thes systems, as well as in other systems wherein it is not practical to replace ion exchange material as it becomes fouled or contaminated, the expense of replacing the ion exchange material may constitute a major drawback.

Systems which utilize more or less directly actuated controls normally do not operate with cartridges, particularly fine mesh cartridges, and the operating cycles thereof are such that diminished capacity gradually brings about diminished flow and, ultimately, flow stoppage.

Other fluid treating systems, such as those used in water treatment, as well as those used in separation or purification of various materials, including proteins, sugar processing, separation or purification of metals or metal compounds and organic materials and the like, also make use of treating materials, such as synthetic anion and cation exchange resins which respond dimensionally to change in their capacity for treatment. These treating systems also have one or more disadvantages such as those described herein.

In view of the foregoing and other shortcomings of the prior art and the failure thereof to provide a practical, simple and effective fluid treating apparatus having the advantages and characteristics referred to herein, and other inherent characteristics and advantages, it is an object of the present invention to provide a fluid treating apparatus utilizing a fluid treating cartridge to treat the fluid and to furnish control data for automatically initiating a regeneration cycle and subsequently a return to an ordinary operating cycle.

Another object of the invention is to provide a fluid treating apparatus which incorporates a plurality of active aggregate particles which are bound together in a cartridge by a matrix which is elastic or flexible to an extent that dimensional variation between states in such aggregate treating particles is reflected in a corresponding dimensional variation in the cartridge.

Another object of the invention is to provide a fluid treating apparatus in which a fluid to be treated is passed through a body of closely wpaced fluid treating aggregate particles having their surface areas freely exposed and which are bound together by a matrix which is elastic or flexible to an extent that dimensional variation between s tates in such aggregate treating particles is reflected in a corresponding dimensional variation in the body.

Another object of the invention is to provide an apparatus in which the active aggregate treating particles are contained in a rigid, semi-rigid, or self-sustaining cartridge which undergoes detectable dimensional variation between states in which the cartridge is fully regenerated when it is in normal use and when it is depleted.

Another object is to provide a treating apparatus in which a given dimension, such as an axial dimension, of a fluid treating cartridge is sensed and used to initiate a valve operation sequence in which a supply of regenerating material or the like and a rinse material may be passed through the apparatus to regenerate the capacity of the cartridge.

Another object is to provide a fluid treating apparatus having a construction in which means are provided so that dimensional variation in the cartridge during the time there is active fluid flow therethrough will not be detected, but in which such dimensional variation is detected during a quiescent state of the apparatus, so that regeneration will not take place during service.

Another object of the invention is to provide a treating apparatus in which a fixed quantity of cartridge capacity regenerating material, such as brine or the like, will pass into the apparatus for regeneration and in which the supply thereof will be automatically replenished during normal operation of the unit for subsequent use in treating the cartridge.

Another object is to provide an apparatus in which full flow through the treating apparatus is maintained at all times rather than being diminished as the capacity of the exchange material is depleted.

A further object is to provide a fluid treating apparatus characterized by an all-fluid operation sequence, that is, a construction in which the flow control valve operating sequence does not depend on electrical, mechanical, or like forces for its operation, other than fluid pressure and fluid flow during use.

Another object is to provide an apparatus in which pressures and forces generated within the apparatus will serve to maintain the apparatus in a given mode of operation and in which dimensional variation of the cartridge causing a switch to the regeneration cycle will not be detected until fluid flow through the apparatus has been shut off.

A still further object is to provide an apparatus in which at least one dimension of a cartridge passing in use through various dimensional states is sensed and this information is used to actuate through intermediate means a regeneration cycle as well as a temporary fluid bypass cycle.

An additional object is to provide a fluid treating apparatus in which a cartridge comprised of very fine mesh material is used to provide a rapid rate of exchange.

Another object is to provide a fluid treating apparatus in which the cartridge is constructed so as to bind the aggregate particles in a manner such that repeated expansion and contraction thereof will not damage the integrity of the particles or that of the cartridge.

A still further object is to provide a cartridge-containing fluid treating apparatus which, when fluid is bypassing the cartridge during regeneration, will not inadvertently pass fluid to be treated through the treating cartridge until regeneration thereof has been completed.

Still another object is to provide a construction in which the cartridge having the dimension which is sensed may be removed and replaced without affecting the other elements of the apparatus.

Another object is to provide a fluid treatment unit in which an adjustment is provided to insure that the correct initial position of a replacement cartridge is established irrespective of variations in cartridge size which result due to normal manufacturing tolerances of the cartridge.

Still another object is to provide an apparatus which includes a fluid treating cartridge wherein resin or other active treating material in the cartridge additionally undergoes dimensional change while changing from a fully regenerated but unrinsed state to a fully regenerated and rinsed state, and providing means for utilizing this dimensional change to initiate and terminate a cartridge rinse cycle.

A further object is to provide an apparatus in which brine or other dense treating fluid may be drained from the portion of the apparatus where it may be trapped upon initial regeneration of the treating capacity of the cartridge.

Another object is to provide a fluid treating apparatus in which only fluid forces present in the fluent liquid are used to circulate regenerating and rinsing fluids through the apparatus.

Another object is to provide a water treating or water softening apparatus capable of attaining at least some of the foregoing objects.

Another object of the invention is to provide a method of fluid treatment which includes treating a fluid with a treating cartridge which responds to its remaining treating capacity from time to time by dimensional change, allowing the cartridge to change dimensionally during the time fluid is passing thereover for treatment, sensing the dimensional change at the termination of each treating cycle, and regenerating a cartridge having a depleted capacity when the cartridge reaches a predetermined dimension indicative of its remaining treating capacity.

Another object is to provide a fluid treatment method which includes passing a fluid to be treated through a treating cartridge which is dimensionally responsive to diminished treating capacity, utilizing the forces present in the fluid flow through the cartridge to maintain the apparatus in a fluid treating mode of operation, releasing these forces during the time fluid is not flowing, sensing the changed cartridge dimension during such period, and, upon detecting a predetermined cartridge dimension, initiating a cartridge regeneration cycle.

Another object is to provide a method for treating fluid flowing intermittently through a treating apparatus which includes sensing the dimension of a dimensionally responsive treating cartridge only during a non-flow portion of the cycle, utilizing pressure responsive means to prevent dimension sensing during fluid flow through the cartridge, and using both static conditions in the apparatus as well as fluid flow by-passing the cartridge during regeneration to prevent unintentional change of the operational cycle during both the treating and regeneration modes of operation thereof.

Another object is to provide an apparatus which includes means for directing the flow of fluid to be treated through two or more filter elements in series with each other.

A still further object is to provide an apparatus which includes means for accommodating two or proportion cartridges or filter elements each adapted for removal of a different constituent or group of constituents from the fluid to be treated.

Another object is to provide a fluid treating apparatus in which a plurality of cartriges or elements are provided, and which includes means for detecting a dimensional change in all of the cartridges or elements, or in less than all of the cartridges or elements.

A still further object is to provide an apparatus in which advantage may be taken of dimensional change in the element or cartridge occasioned by size change of the aggregate particles, to afford simultaneously mechanical action cleaning and capacity regeneration.

Another object is the provision of a treating apparatus having at least one element containing aggregate material which is sufficiently finely divided to provide treatment rates high enough to remove materials not previously able to be removed from a fluid stream in a practical manner under similar conditions.

Another object is to provide a fluid treating apparatus in which ready replacement of the cartridge or element provides significant economy in relation to prior art apparatus.

These objects and other objects and advantages which are inherent in the invention are accomplished by providing a treating apparatus in which the circulation of a regenerating fluid for the treating cartridge is accomplished under the control of valves operated in response to a dimensional change in the fluid treating cartridge, which change occurs when the treating capacity of the cartridge is depleted and which is sensed during a time interval when fluid is not flowing through the cartridge. The invention also accomplishes its objects by a provision of a method of treating a fluid which includes passing the fluid intermittently through a treating cartridge, sensing a change dimension in the cartridge during a period of non-flow through the cartridge, regenerating the treating capacity of the cartridge by contacting it with a regenerating fluid in response to a predetermined degree of dimensional change, and by-passing water around the cartridge in the event flow in the apparatus is called for during regeneration.

The exact manner in which the invention accomplishes these objects will be more clearly apparent when reference is made to the following detailed description of the preferred embodiments of the invention set forth by way of examples and illustrated in the accompanying drawings in which like reference numbers indicate corresponding parts throughout.

BRIEF DESCRIPTION OF THE DRAWINGS

FIG. 2 is an enlarged vertical sectional view of the valve body portion of the fluid treating apparatus of FIG. 1;

FIG. 3 is an enlarged vertical sectional view, with portions broken away showing a portion of the dimension detector portion and related portions of the apparatus of FIG. 1;

FIG. 4 is a horizontal sectional view, with portions broken away, taken along line 4—4 of FIG. 3;

FIG. 6 is a diagrammatic view showing flow characteristics of the fluid treating apparatuses of the invention;

FIG. 7 is an enlarged vertical sectional view of a valve used with the present invention;

FIGS. 8–10 are sectional views of various alternate cartridge holding arrangements;

FIG. 11 is a perspective view of one form of such holder;

FIG. 12 is a sectional view of a portion of another form of the apparatus of FIG. 1; and FIG. 13 is a sectional view, with portions broken away, of another form of fluid treating apparatus.

Figure 1:
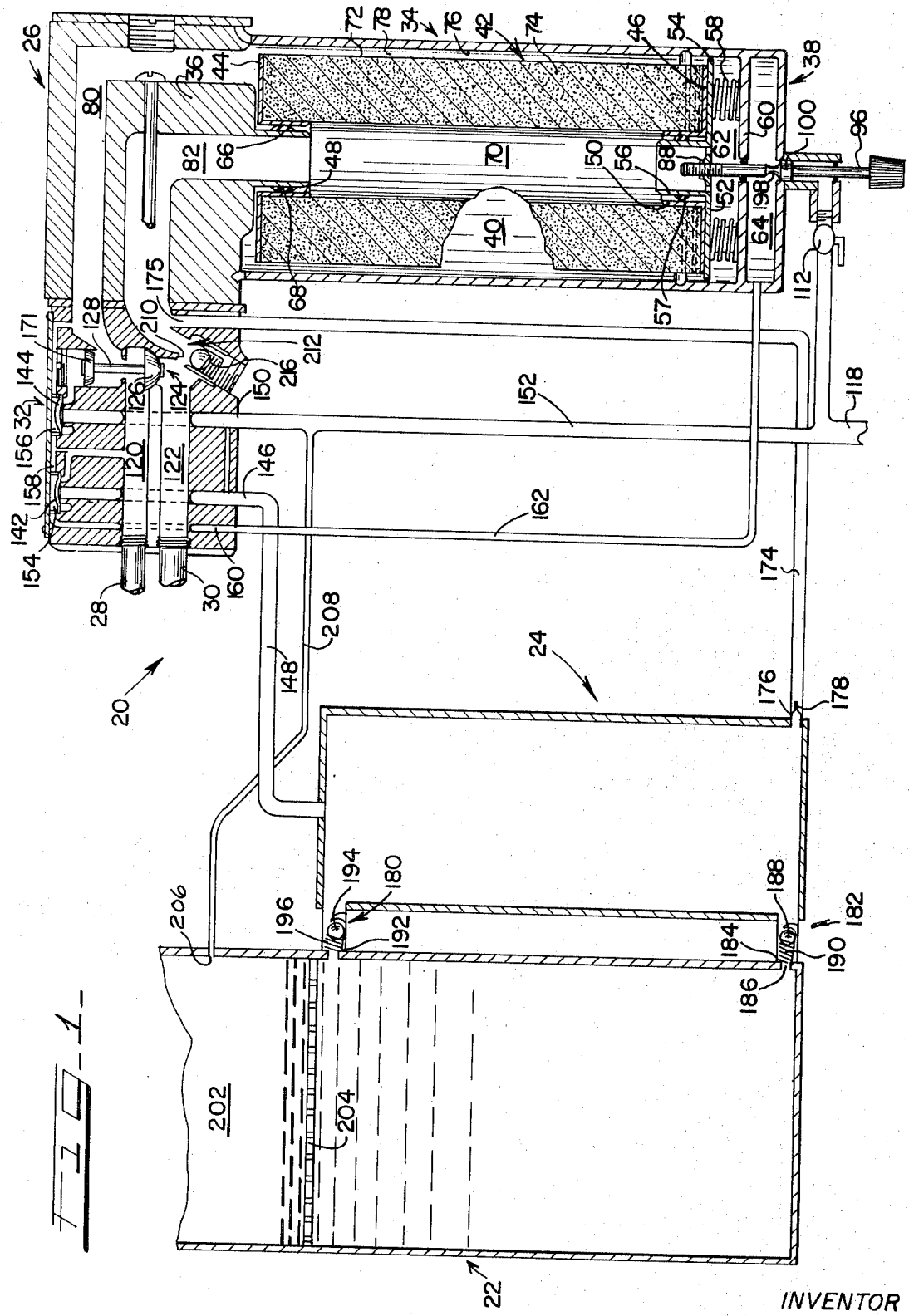
FIG. 1 is a vertical sectional view of a fluid treating apparatus made in accordance with the invention.

Before referring to the drawings in greater detail, a brief explanation of some of the terms used herein, some of the preferred materials, and some advantages of particular arrangements of elements and materials used herein, will be set forth. In one common form of water treating, namely, water softening, which typically comprises removal of "hardness" from water by removing therefrom objectionable ions such as calcium, magnesium, barium, and the like by chemical methods, it is common to provide a bed of ion exchange material which will take on a number of calcium ions and release an equivalent number of sodium ions into the water downstream of the ion exchanger. After a certain amount of cumulative hardness is removed from the water, the capacity of the ion exchange material is depleted, it is thereafter replenished by washing the ion exchange material with brine and rinsing with water, whereupon the treating cycle may be repeated. During the time regeneration takes place, water service is either shut off altogether or the water flow by-passes the ion exchanger so that hard water is used during this period. The form of bed used to treat the water may be that of a loose bed of materials or may be that of a self-supporting body such as a cartridge or the like. The particle size of the aggregate may vary considerably, it being generally established that with finer particle size, an increasingly faster ion exchange rate will take place. It is also generally true that the finer particle size loose beds are more easily clogged by reason of their tendency to settle, and because of the likelihood of physical entrapment of particles in the interstices between particles.

In general, cartridges employed in the apparatus of the present invention employ a binder of matrix material which is sufficiently elastic so as to permit a dimensional change in the bound aggregate particles to be translated into a corresponding and generally reproducible dimensional change in the cartridge. Also, the aggregate particles are preferably bound together in a manner wherein substantially their entire surface area is freely exposed for contacting fluids to be treated therewith.

In the present invention, the cartridge is preferably, although not necessarily, made by a novel method described in copending application Ser. No. 581,507, filed Sept. 23, 1966, now U.S. Pat. No. 3,538,020, which is a continuation-in-part of original application Ser. No. 490,802, filed Sept. 28, 1965, now abandoned. Briefly, cartridges produced according to this method are characterized by activity which is substantially equal to the activity of a free bed of particles of the same size, which have little of their interstitial volume filled and which exhibit relatively low pressure drop thereacross. Such cartridges, in spite of the small size aggregate, are nevertheless able to exhibit self-sustaining, even semi-rigid or rigid characteristics in cartridge form.

The present invention is, therefore, advantageously embodied in an apparatus wherein such cartridge may be used, typically a cartridge having an aggregate of a 50 by 100 or smaller mesh particle size.

By the term "cartridge", as used herein, is intended to be meant only the element comprised of the aggregate material and the binder; the term "element" is often used in this connection by others and for purposes of this invention these terms are considered synonymous.

Although larger particle sizes may be used, a principal advantage of the use of a very fine mesh ion exchange resin is that the regeneration time thereof is so fast that, during normal operation, such as during use of a water softener in a household, there is very little likelihood that the water will be used significantly, or even at all, while the valves were positioned so as to by-pass any water needed during regeneration. Therefore, since in continued use, the dimension tending to change is not sensed, the regeneration cycle cannot occur until the water is shut off. With regeneration times typically on the order of less than one minute, and in most cases certainly no more than three to five minutes, it is very unlikely that the unit would be in the regeneration mode when desired to be used. However, in view of the extremely fast regeneration achieved with fine mewh systems, it follows that raw water, via the by-pass during the regeneration cycle, will be used for such a short period of time that it presents no practical problem.

Typically, an apparatus according to the invention, used by a normal sized family in an area of moderate water hardness, would be regenerated from one to three times per day, for example.

Although it will be understood that various fluids may be treated, different cartridges may be used, etc., as more fully set forth elsewhere herein, the invention will be specificallly described by way of illustrations of an apparatus in which an ion exchange resin is the principal element of the treating cartridge, in which water is softened by ion exchange, and in which brine is used to regenerate the ion exchanger. Such apparatus also preferably includes a treating tank in which the cartridge is disposed, and means for allowing water to flow into and out of the tank, as well as for by-passing the tank. An arrangement for backwashing and regenerating the cartridge which includes valves and connections from a brine accumulator tank to the treating tank is preferably provided, as is a brine storage tank from which the brine accumulator tank may be periodically replenished. In one embodiment, flow control is accomplished by mechanical or electromechanical valve actuation, while in another embodiment, valve control is accomplished hydraulically merely in response to the various states achieved by certain portions of the apparatus during use, such construction being sometimes referred to herein as a fluidic device.

In the operation of the device, reference will sometimes be made to a treating mode or phase of operation, during which water is passed through the cartridge, to a quiescent mode or phase during which water is not flowing through the cartridge, but is in static contact therewith, to a regeneration phase in which the cartridge is backwashed with regenerating material, and which includes a rinse cycle, and to a by-pass mode or phase, in which water by-passes the treating cartridge because the cartridge is being regenerated and unavailable for service. By-pass occurs only if water is drawn during regeneration; operation does not inherently include or rely on by-pass. It is only provided so that in the event water service is desired during regeneration, water may be used without cycle interruption.

Referring now in particular to FIG. 1, the invention is there shown to be embodied in a fluid treating apparatus 20 typically adapted to soften water and which comprises a brine storage tank 22, an accumulator tank 24 for receiving a measured amount of brine from the storage tank 22, and a water treating assembly 26 which includes an untreated water inlet pipe 28, a treated water outlet pipe 30, a valve body 32 for controlling fluid flow, through certain portions of the apparatus, and a water treating tank assembly 34. The tank assembly 34 includes a head portion 36, a base portion 38 and a tank unit 40.

A treating cartridge unit 42, the composition and manufacture of which is described in said copending application Ser. No. 581,507, filed Sept. 23, 1966, is supported in place within the tank 40. The cartridge unit 42 includes a top end cap 44, a bottom end cap 46, and a pair of inwardly extending annular locating flanges 48, 50. Means for engaging a portion of the unit 42 and detecting one dimension thereof is provided, in this embodiment, in the form of a movable bottom support plate assembly 52 having an O-ring seal 54 or the like on the outer periphery thereof and a cartridge retaining sealing flange 56 having sealing lips 57 on the inner periphery thereof. Resilient bias is applied to the plate 52 by springs 58 supported on a fixed bottom wall 60 of the tank 40. The wall 60 serves to separate an intermediate, downstream reference pressure chamber 62 in the interior of the treating tank unit 40 from a back pressure chamber 64 to which further reference will be made herein.

A downwardly extending flange 66, having sealing lips 68 thereon retains the upper portion of the cartridge unit 42 in place within the tank 40. An inner surface of the cartridge 42 defines an axially extending hollow core 70 and the outer surface 72 of the cartridge body 74 is spaced apart from an inner wall 76 of the tank 40 to define therebetween an annular water inlet region 78 communicating with a water inlet passage 80 in the tank head 36. By reason of the disposition of the elements just described, it will be appreciated that water flow through the body 74 of the unit 42 is generally radially inward flow, since water coming through the passage 80 flows from the region 78 inwardly to the core region 70 and out the outlet passage 82. The sealing lips 57 and 68 prevent the water from by-passing the filter at the tip and bottom thereof, and the O-ring 54 prevents water from flowing from the inlet region 78 of the tank 40 along the walls 76 and into the chamber 62.

Referring again to the dimension detector which includes the support plate assembly 52, this unit may be seen (FIGS. 3 and 4) also to include a threaded, stem-receiving bore 84 in a center nut portion 86 which is attached to a plurality of outwardly extending arms 88 forming a spider 90, the passages 92 therein permitting fluid flow from the core 70 into the chamber 62. Received within the nut 86 is a threaded end portion 94 of a stem 96 which includes a tapered, reduced diameter portion 98 and an enlarged valve land 100. An O-ring 102 disposed within an opening 104 in the bottom wall 60 snugly engages a portion of the stem 96. An adjustment knob 106 is provided on the bottom of stem 96, for reasons which will appear more fully herein. A packing 108 permitting axial movement of stem 96 is disposed in a portion of a drain pipe 110, flow through which is controlled by a petcock 112.

Although the operation of these parts will be set forth in greater detail herein, in brief, it may be seen that as the cartridge expands and contracts, the support plate 52 may move vertically in one direction under the influence of the springs 58, and in the other direction against the compressive force of the springs by reason of differential pressure across plate 52, resulting from the fact that the fluid filling chamber 62 communicates only with the downstream side of the cartridge 42, and hence exhibits downstream pressure only on the bottom surface of plate 52, while fluid upstream of the cartridge in region 78 exerts upstream pressure, during fluid flow, on the top surface of the plate 52. When there is no fluid flow, there is no pressure differential. This is an important aspect of this particular embodiment of the invention, as will presently appear.

When the reduced diameter portion 98 of the stem 96 passes through the O-ring 102, liquid may pass through the opening 104, and when the land 100 clears the opening 114 in the bottom wall 166, fluid in the back pressure chamber 64 may be bled through the pipe 110, the petcock 112, and into the drain line 118. Likewise, extreme upward movement of the plate 52 moves the O-ring 54 into registry with the groove 113 in wall 76, allowing fluid passage from region 78 to chamber 62.

Referring now to the valve body, and in particular to FIGS. 1 and 2, a number of components are shown to be included therein, namely, a water inlet passage 120 communicating with the pipe 28 and an outlet passage 122 communicating with the pipe 30. A by-pass passage 124 extends between the passages 120, 122 but is normally closed by the water flow control or main operating valve 128 the head 126 of which rests on the seat 130 which defines the opening 124. A seat 132 for the upper surface 134 of the valve head 126 defines a passage 136 through which untreated water flows from passage 120 into passage 80, in normal use of the water softener. The valve body 32 also includes a pair of valve seats 138, 140 receiving a pair of diaphragm valves 142, 144, one for closing a fresh water passage 146 communicating through a pipe 148 to the brine supply tank 24, and the other normally closing a drain passage 150 communicating with a drain pipe 152. Liquid receiving pressure chambers 154, 156 connected to each other by a passage 158 provide means for urging the diaphragm valves 142, 144 to a normally closed state when fluid under pressure is supplied thereto. The chambers 154 and 156 are operatively connected to the back pressure line 160 through passage 162, and to the inlet passage 120 through passage 164. The underside of the valve 142 receives service inlet water pressure through the branch 166 of passage 164. The underside of valve 144 is acted upon by fluid forces in passage 168, which communicates with the chamber 170 above the disc 171 which forms a part of valve 128 and slides freely in chamber 170. With valve 144 closed, pressure above and below disc 171 is substantially equal.

It will also be noted that an additional passage 172 into chambers 154, 156 is provided, so that the pressure in passage 120, in which reduced diameter stub line 173, and in passage 80 may be substantially equalized, for reasons which will appear more fully herein.

Referring now to the accumulator tank 24, and in particular to FIG. 1, it will be seen that, in addition to the pipe 174 which extends between the tank 24 and the port 175 in the passage 82, the accumulator tank 24 includes an outlet sleeve 176 having a one way valve 178, such as a duck bill valve or the like therein, as well as two similar check valve assemblies 180, 182, the first of which includes a seat 184 defining an opening 186, a ball 188 and a spring 190 urging the ball to an open position. The second valve 180 is similarly constructed, and includes a seat 192, a ball 194 and a spring 196. Thus, positive pressure inside the accumulator tank 24 will force the fluid therein outwardly through the valve 178 into the pipe 174 and into the outlet port 175 which is in communication with the outlet passage 82 of the treating tank assembly 34. This same pressure will also urge both balls 188 and 194 into the closed position thereof, so that fresh water flowing through pipe 148 will not displace the brine in the accumulator 24 into the storage tank 22 through valves 180 and 182.

The brine storage tank 22 includes a supply of salt 202 disposed on a grid 204. The water level in tank 22 normally falls above the grid along a line equal to the height of the opening 206 to the drain line 208. In this way, water within the tank 22 is in contact with salt so that a saturated solution always forms in the interior of the tank 22.

Referring now to the valve body and the area thereof adjacent the brine inlet port 175 (FIGS. 1 and 2), a valve seat 210 is shown to define an opening 212 which is closed when the ball check valve 214 is urged into a seated position by a spring 216.

Referring now in greater detail to the operation of the unit, it will be understood that during normal or intermittent service, untreated water is received from pipe 28, passed through the cartridge unit 42, and emerges through line 30; water stands still within the unit during the quiescent operational phase. After the treating capacity of the cartridge has been depleted, the capacity thereof must be regenerated, by the regeneration mode referred to above. In the following description of the operation of the device, certain assumptions will be made for purposes of simplifying the description, and the reasons therefor will be set forth further herein. Assuming now that an exterior water tap (not shown) is connected to outlet pipe 30, and further assuming that water is flowing therethrough with the elements of the apparatus in the position shown in FIGS. 1, 2 and 3, the operation of the treating apparatus may be described as follows. Water entering pipe 28 is forced through passage 120, around the stem of valve 128, through passage 80 into the region 78 lying radially outwardly of the filter body 42, and then through the body 74 of the cartridge 42, passage therethrough causing a slight but significant loss of pressure and giving rise to a differential pressure on either face of the plate 52. Water then proceeds from the interior or core 70 of the cartridge 42 into the outlet passage 82, through the opening 212 into passage 122 and out the pipe 30. Water flow through opening 212 under service or ambient pressure is sufficient to depress the relatively weak spring 216, moving the ball 214 away from the seat 210. The lip seals 57, 68 prevent water from by-passing the cartridge around the flanges 48, 50 of the end caps 44, 46 and into the center core 70 of the cartridge 42. Although the center passage 70 is filled with water, and although the openings 92 in the spider 88 provide a supply of water so as to fill chamber 62, the pressure in chamber 62 is always lower than the pressure in passage 80 and in the region 78 because of the pressure drop across the filter. Therefore, the higher pressure on the upper side of the plate 52, which is sealed by the ring 54 from chamber 62 will bias springs 58 slightly downwardly at any time water is flowing through the apparatus.

Referring now to FIGS. 1 and 3, it will be seen that since the stem 96 is fixed in relation to the plate 52, when the plate 52 is biased downwardly under differential pressure during operation, the valve land 100 remains in or near the position shown in FIGS. 1 and 3, that is, closing off fluid communication between the back pressure chamber 64 and the drain pipe 118. During the time water is passing through the cartridge, the remainder of the system remains fluid tight since, although a given volume of water under pressure is present in passages 164, 168, this water cannot escape therefrom through line 162 inasmuch as the valve land 100 closes the opening in the chamber 64. Since the surface area exposed to water pressure on the upper surfaces of valves 142, 144 is greater than the area exposed to water therebeneath, these valves remain closed so that water likewise cannot escape therefrom through drain line 152 or into the accumulator tank 24.

When a faucet or the like connected to pipe 30 is shut off, the apparatus reacts in the manner set forth below. The ball 214 is urged by spring pressure to a closed position blocking passage 212. Valve 128 remains down by reason of its density, static pressure block valves 142, 144 and pressure in the outlet passage 82 prevents brine flow through port 175. However, in respect to the cartridge 42 and the parts operatively associated therewith, conditions are different in the quiescent or sensing phase, during which neither treating nor regeneration is taking place. Before detailing such action, however, the behavior of the cartridge will be briefly summarized.

A cartridge made as referred to herein and arranged in the manner shown in FIG. 1, when comprised of the so-called strongly acidic cation exchange resins, such as one of those purchased commercially for water treatment from Dow Chemical Co. (e.g. "Dowex" HCR, HGR, HDR), Rohm and Haas Co. (e.g. "Amberlite" IR-120, IR-122, IR 124, etc.), Ionac Chemical Company (e.g. "Ionac" C-240, C-250, C-255.) or like suppliers of known ion exchange materials, will, when completely in the sodium form, be characterized by a given axial dimension. These resins are sulfonated polymers of styrene and divinylbenzene. In general, these resins shrink in going from the hydrogen to the sodium to the calcium-magnesium form. Accordingly, as the ion exchange capacity of these resins is depleted by exchanging the sodium ions therein for calcium ions, for example, the cartridge 42 will progressively undergo an axial shortening until substantially all of its ion exchange capacity is exhausted. Upon being treated with a brine regenerating solution, the axial dimension shortens even further, this fact being believed to be accounted for by dehydration of the ion exchange resin brought about by treatment with the salt water regenerating solution. Upon removing the excess brine from the cartridge by rinsing with water, the cartridge expands to its original dimension, which is equal to the largest dimension it will have in normal use, that is, a longer dimension that it will exhibit either when the resin is exhausted or when it is fully charged with and in the presence of a strong brine solution.

The present invention, however, is not limited to any particular ion exchange resin or fluid treating material other than one which produces a dimensional change in accordance with the extent to which such resin or material is spent when it is being used to produce or achieve the desired fluid or water treatment. For example, other suitable ion exchange resins which can be employed in cartridges used with these novel fluid treating apparatus include the so-called strongly basic anion exchange resins which generally swell in going from the chloride form to the hydroxide form, that is they shrink during exhaustion and swell during regeneration. Typical examples of the strongly basic anion exchange resins which are commercially available include "Dowex" SBR, SBR-P and SAR (Dow Chemical Co.); "Amberlite" IRA-400, IRA-402, IRA-900, (Rohm and Haas Company); "Ionac" A-540, A-580, A-641 (Ionac Chemical Company); "Duolite" A101-D, A10-2-D (Diamond Shamrock Corp.); and "Permutit" S-1, S-2, S-K (Permutit Company).

Similarly, the so-called weakly acidic cation exchange resins which generally swell in going from the sodium form or hydrogen form to the calcium-magnesium form can be suitably employed in cartridges used with the apparatus of the present invention. These resins shrink in going from the sodium or calcium form or magnesium form to the hydrogen form. They also shrink in going from the sodium form to the calcium or magnesium form. Thus, in water demineralization, they swell during the service cycle and shrink during the regeneration cycle. In water softening using the sodium form, they shrink during calcium and/or magnesium removal, and swell on regeneration and rinsing. Typical examples of these weakly acidic cation exchange resins which are commercially available include "Dowex" CCR-1 (Dow Chemical Co.); "Amberlite" IRC-84 (Rohm & Haas Co.); "Ionac" C-265 (Ionac Chemical Co.); "Permutit" Q-210 (Permutit Company); and, "Duolite" ES-80 (Diamond Shamrock Corp.).

Also, the so-called weakly basic anion exchange resins can be employed in cartridges which are used in apparatuses embodying the present invention. These resins generally swell during demineralization service in going from the hydroxide form to the chloride form and shrink during regeneration. Typical examples of these weakly basic anion exchange resins which are commercially available include; "Dowex WGR" (Dow Chemical Co.); "Amberlite" IR-45, IR-4B, IRA-68 and IRA-93 (Rohm and Haas Company); "Ionac" A-260, A-300, A-310 and A-320 (Ionac Chemical Company); "Duolite" A2, A4, A6, A7, A30-B, ES-57

(Diamond Shamrock Corp.); and, "Deacidite" A, CCG, and S-440 (Permutit Company).

Referring now again to FIG. 1, it will be assumed that the user has run sufficient water through the apparatus to deplete the ion exchange capacity to a predetermined point, such as the point where the cartridge is no longer effective, or exhibits a reduced treating rate.

Thereupon, during any quiescent phase, with no water flow in passages 80, 82 the pressure above and beneath the plate 52 will equalize, permitting the springs 58 to push the plate 52 into engagement with the bottom end cap 46. The end cap 46, by reason of the depleted capacity of the cartridge, will have moved axially upwardly in the orientation of FIG. 1, or, stated otherwise, the reduced overall axial dimension of the filter will reduce the dimension between the upper end cap 44 and the upper surface of the plate 52. Since the stem 96 is fixedly attached to the spider 90 which moves with the plate 52, the land 100 will move upward, opening the interior of the chamber 64 to the drain pipe 118. Loss of water from the chamber 64 releases back pressure in pipe 160 and passage 162, with the result that water supplied through passages 172, 173 is no longer present in sufficient volume to establish a pressure on the tops of the diaphragm 142, 144. Since the water pressure in passages 166, 168 is effective, to exert a force on the bottom of the valves 142, 144, these valves move to the open position.

With the diaphragm valves opened, water passing through branch 166 of line 164 traverses passage 146, and line 148, entering the accumulator tank 24. The increased pressure in tank 24 serves to close both ball check valves 180, 182, and acts to move the contents of the accumulator tank 24 through the duck bill valve 178, through line 174 and into port 175 for passage into the core 70 of the cartridge 42 by way of passage 82. Since, during this time, water lying above the disc 171 flows through port 168 and into the drain line 152 through open valve 144, the entire valve assembly 128 is pulled by fluid flow to a raised position wherein the upper surface 134 of the head 126 engages the seat 132, thereby opening the passage 124 to flow of water from passage 120. This permits water to by-pass the cartridge contained in the tank 34. At this time, with spring 216 urging the ball 214 into sealed relation against the seat 210, pressure in passage 122 is exerted on the ball 214 by reason of by-pass flow.

The charge of brine contained in tank 24 is circulated under pressure radially outwardly through the cartridge 42, thereby regenerating the cartridge 72, and incidentally washing material trapped on the outer surface thereof backwards with the salt stream through region 78, through passage 80, and into the drain pipe 152. As long as the conditions just described prevail, fresh water will continue to pass through the tank 24 and through the treating tank 34 thereby providing a fresh water rinse for the cartridge 42 following the regeneration with one volume of brine from tank 24.

As pointed out above, however, the cartridge, upon exposure to the salt in the brine solution contracts. This change of dimension is sensed by the plate 52 which moves further axially upwardly, thereby moving stem 96 in relation to the wall 76 and moving the O-ring 54 upwardly into the enlarged diameter area defined by the relieved wall surface 113. Because of the flow direction of the fresh water and the greater density of the brine in relation to the fresh water then passing through the apparatus, the brine is flushed downwardly into the chamber 62. Similarly, salt water trapped in chamber 62 is released through opening 104 into chamber 64, since the relieved portion 98 of stem 96, in an extreme axial position, opens port 104. Ultimately, salt water from both above and below plate 52 flows out the drain pipe 118 after passing through the petcock 112.

After the cartridge 42 has been exposed to the fresh water following the treatment of the cartridge with the brine, the cartridge 42 expands to a "reference point" or "reference state characteristic" of the cartridge when the aggregate is in the fully replenished and hydrated form. This expansion moves the plate 52 and associated O-ring 54 downwardly and causes snug engagement between the O-ring 54 and the lower portion of the wall 76, closing both the opening through which the reduced diameter portion 98 of the shank 96 moved and the opening closed by land 100. Shortly thereafter, water passing through pipe 160 and passage 162 accumulates in chamber 64, the drain of which is blocked. When chamber 64 is filled, back pressure in chamber 154, 156, closes diaphragm valves 142, 144.

Thereupon, rinse water may no longer flow in line 148, and therefore ceases passing through the tank 24. Under these conditions, and with valve 144 closing line 152, the valve 128, having equal pressure on both the bottom and top thereof by reason of static water in passages 120 and 172 respectively, falls by gravity to the lower position shown in FIG. 1. At this point, the water softener is ready to pass water entering pipe 28 through the treating cartridge in the normal manner.

Minor variations in the "reference point" can occur due to changes in temperature, pH, or the like. These minor variations, however, can be compensated for by the adjustment knob 106.

A particular advantage which results with the preferred embodiment wherein the ion exchange resin expands during the rinse cycle is that collected sediment is removed and flushed away by the rinse water. For example, in test cartridges of this type which were made in accordance with the previously referred to binding technique of copending application Ser. No. 581,507 repeated operational tests have shown that this sediment removal feature is so effective as to provide the same pressure drop for the regenerated cartridge as was obtained with the new cartridge, irrespective of the number of regenerative cycles experienced by such cartridge. This is particularly true with the fine mesh resin wherein higher flow rates are normally employed.

Upon restoration of the apparatus to the state just described, the valves 180, 182 disposed between the accumulator tank 24 and the storage tank 22 are urged open by reason of the action of the springs 190, 196, which overcome the now reduced pressure in tank 24 and permit brine to fill accumulator tank 24 from the storage tank 22 by convection of the more dense brine.

Typically, the above described apparatus may include a cartridge of about a 10 inch length and a 2 to 3 inch diameter, comprising a 100 by 200 mesh ion exchange resin bound by the techniques referred to in the aforesaid patent application Ser. No. 581,507. In the case of a resin having the extremely fine $100 \times 200$ mesh particle size, the regeneration of the ion exchange beads or particles takes place so fast that, in actual use, the limiting factor in regeneration time is the rate at which brine may be moved into contact with the aggregate particles. Typically, this might be a period of half a minute or less up to about 3 minutes. Such a cartridge typically contains about 1/30 of a cubic foot of ion exchange material, and a capacity of about 1,000 grain gallons, that is, it is able to remove hardness from a thousand gallons of water having 1 grain hardness, 100 gallons of water having 10 grain hardness, etc. Nevertheless, the softener is arranged so that water will be by-passed in the event that a water tap is turned on during regeneration.

By reference to the above description, it will be appreciated that in this embodiment, no external power supply or mechanism of any type other than water pressure is required to provide the regeneration cycle, which occurs at periodic intervals, but only when needed. Likewise, brine replacement occurs rapidly; typically, for example, convection of the brine from the storage tank 22 to the accumulator tank 24 could take place in substantially less than one minute with appropriately sized orifices.

Figure 5:
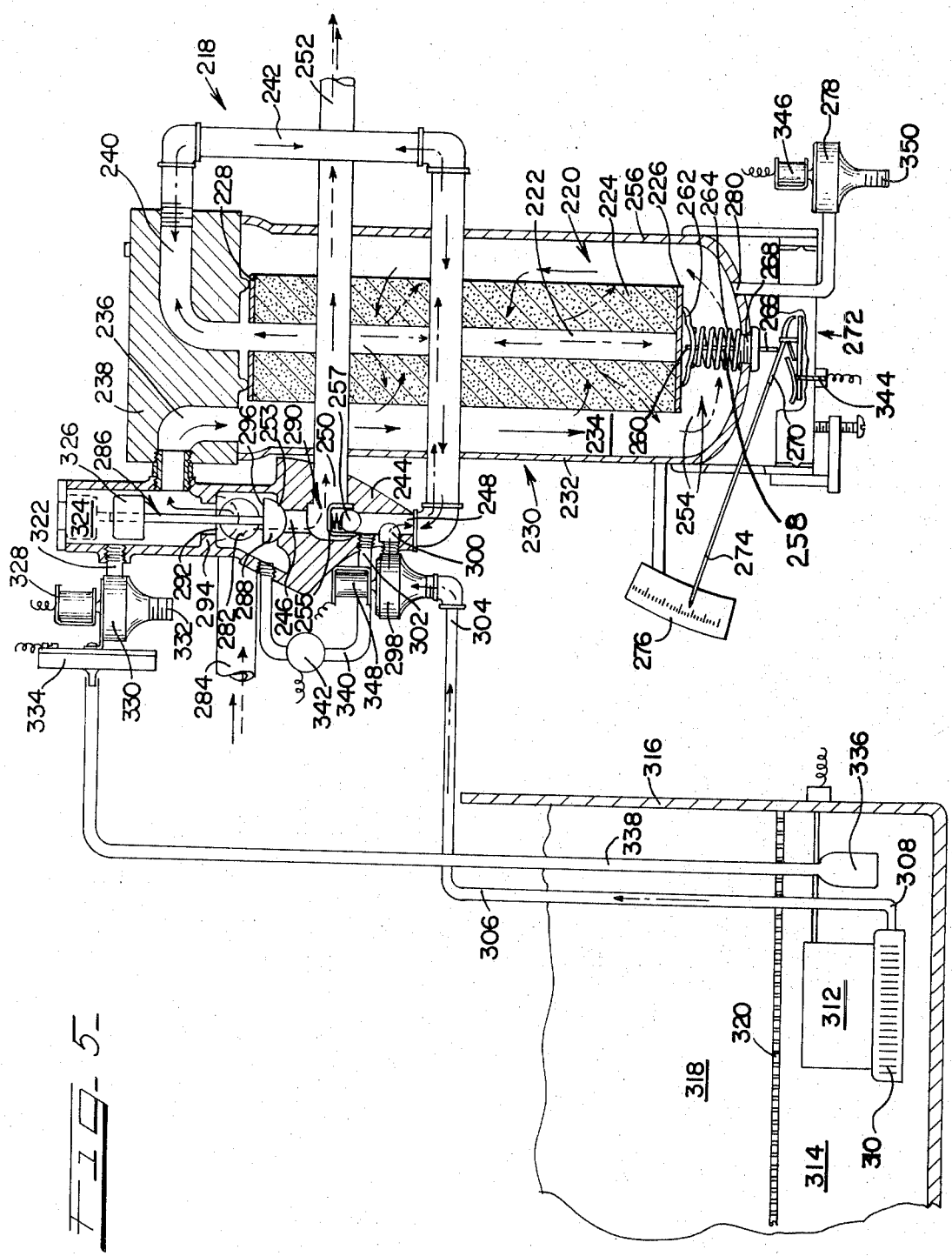
FIG. 5 is a vertical sectional view of a modified form of the fluid treating apparatus of the invention.

Referring now to FIG. 5, another embodiment of the invention will be described which utilizes the same principle of cartridge dimension sensing to initiate regeneration cycling, but which differs somewhat in details of construction and mode of operation.

In this embodiment, the water conditioning or softening apparatus 218 includes a treating cartridge 220 having a hollow core 222 defined by a cylindrical cartridge body 224 having a pair of end caps 226, 228 respectively thereon. The cartridge 220 is disposed within a treating tank 230, the walls 232 of which define inwardly thereof a treating section 234 upstream of the cartridge 220, section 234 being in communication with a water inlet passage 236 in the tank head 238. An outlet passage 240 in the head 238 is operatively connected through pipe 242 to the interior of valve body 244, which includes a water by-pass passage 246, a treated water inlet passage 248 and a treated water outlet passage 250 to which an outlet pipe 252 is attached for communication with an outlet valve (not shown), through which treated or untreated water may flow, depending on the mode of operation of the unit 218. A normally closed check valve 253 including a spring 255 and a ball 257 is disposed between passages 246 and 248.

A detector assembly 254 is located in a lower wall portion 256 of the treating tank 230 and includes a stem 258 having one end 260 thereof attached to a plate 262 which is urged by spring 264 against the end cap 226. A lower extension 266 of the stem 258 extends through a seal unit 268 and downwardly into contact with one contact 270 of a normally open switch assembly 272. A pointer 274 is operatively associated with the switch 272, so that an end portion of the pointer 274 may indicate on a scale 276 the extent to which the end cap 226 of the cartridge 220 has moved upwardly from a reference position in use, and may accordingly indicate the degree to which the treating capacity of the cartridge has been depleted.

A solenoid operated drain valve 278 having an inlet 280 communicating with the interior of the tank 230 and an outlet 350 extends through the bottom wall portion 256 of the tank side wall 232, for reasons which will presently appear.

Referring again to the valve body 244, it can be seen that a water flow passage 282 is formed therein for receiving untreated water from inlet pipe 284, and that a movable principal operating valve 286 is disposed within the body 244 in a manner such that, with the lower head 288 thereof in position on seat 290, passage 246 is blocked to passage therethrough of untreated water, whereas the opening 292 defined by the valve seat 294 remains open so that water passing through inlet passage 282 may enter the passage 236 in the head 238. An upwardly facing outer margin 296 of the valve head 288 is adapted to sealingly engage seat 292 in another position of the valve 286, thereby opening passage 246 to the flow of water entering the valve body 244 through inlet passage 282.

Also associated with the valve body 244 is a solenoid operated valve 298, the outlet 300 of which enters the body 244 in the passage 248 disposed below rinse inlet 302. The construction and operation of this valve 298, which appears in FIG. 7, will be described in detail herein. The inlet 304 of valve 298 is connected through line 306 to the outlet 308 of a submersible centrifugal pump 310 driven by motor 312 and disposed in the brine storage area 314 of the brine tank 316. A supply of salt 318 rests on a grid 320 above the liquid brine storage area 314, so that a crystalline salt source is available and in contact with the liquid brine solution in equilibrium therewith.

Referring now to the upper portion of the valve body 244 it will be seen that an opening 322 is disposed in the chamber 324 with a disc 326 of the valve 286 disposed therebelow in the closed position of the valve 286. A solenoid 328 is associated with a drain valve 330 which includes a drain opening 332 and a suitable liquid level detecting means such as, for example, a pressure responsive diaphragm type control element 334 operationally associated with a pressure detector 336 through an air line 338. While in some instances a float valve may be used as the liquid level detection means, the control element 334 shown in the illustrated embodiment offers certain advantages which are more fully set forth in U.S. Pat. No. 3,470,905 together with a detailed description thereof.

The valve body 244 is also provided with a by-pass line 340 for allowing untreated water flowing into line 284 to be supplied as rinse water to the passage 248 at inlet 302 under the control of solenoid operated valve 342 during the rinse cycle following regeneration, as more fully set forth hereinafter.

Referring now to the operation of the unit shown in FIG. 5, it will be assumed that water is flowing into pipe 284 for treatment by cartridge 224, and that an adequate supply of brine 314 is disposed in tank 316. In this mode of operation, valve 286 is positioned so that water flowing through pipe 284 enters passages 292 and 236, then flows through the cartridge 220, and having been treated therein, flows out pipe 242, into passage 248, and out passage 250 and pipe 252, respectively. The pressure of ambient water entering passage 282 serves to hold the head 288 of valve 286 on the seat 290, since water in passage 250, having passed through the cartridge, is of lower pressure, and since a smaller valve head area is exposed to water in passage 292, for example. During this mode of operation, assuming that the treating cartridge 220, which is of the same construction as that referred to above and described more fully in said copending application Ser. No. 581,507, retains a significant part of its treating capacity, treated water will continue to pass through the pipe 252 as demanded by conditions of use. When the apparatus 218 is in a quiescent phase, that is, with no water to be treated flowing therethrough, the main operating valve 286, being more dense than water, will remain seated.

When the ion exchange capacity of cartridge 220 becomes depleted, it reaches a dimension associated with the depletion level which may be predetermined by manipulation of the adjustment mechanism 344 of switch 272, the normally opened switch 272 will be closed. Current flowing through switch 272 will activate solenoid 328, and pump 310. This serves to open the normally closed diaphragm in the valve 330 so that the drain port 332 thereof is open. The flow of water through passage 322 and attendant pressure drop in chamber 324 will cause valve 286 to rise rapidly with the result that a liquid-tight seal will be created between the outer margin 296 of the head 288 and the seat 294.

This permits water to flow through the by-pass passage 246 into passage 250, and out pipe 252. Thus, water starts by-passing the treating cartridge as soon as valve 286 rises from its seat 290. Since pump 310 is activated at the same time solenoid 328 is activated, the brine pump 310 begins to circulate brine through valve 298. The brine flows in a reverse direction relative to flow in the treating mode, through pipe 242 and passage 240 into the core 222 of the cartridge 220, and thereupon radially outwardly through the cartridge body 224 for regeneration thereof. Pump 310 is a low pressure pump, and accordingly, the brine is circulated under relatively considerably less pressure than inlet pressure, and with lower flow rate than service water. Having passed through port 236, brine traverses passage 322 and flows out the drain opening 332 in the valve 330.

After a predetermined volume of brine is taken from the supply tank 314, the pressure sensitive detector 336 actuates the switch 334, and solenoid 346, solenoid 342, and, solenoid 348 are simultaneously actuated. As solenoid 346 is actuated, valve 278 is opened, and the interior of the tank 230 is therefore vented through drain opening 350 to rid the tank of excess brine. Actuating solenoid 342 shunts a portion of the water entering passage 282 around passages 246 and 250, and directs this portion of the water to the rinse water inlet 302 in body 244. With a larger flow volume occurring through passages 246 and 250 than occurs through line 340, and with the pressures in these areas being substantially the same, the additional force of the spring 255 on the ball 257 of check valve 253 helps retain this valve in the closed position, and rinse water therefore continues to circulate backwardly in the apparatus 218 in respect to the direction of water flow during the treating cycle.

With the drain valve 278 open, any brine remaining in the tank 230 is drained from the interior thereof. During this time, a portion of the water entering passage 248 through inlet 302 flows through valve 298 and into the brine supply tank 314, since, as pointed out above, the nature of the pump 310 is a non-positive displacement type pump and the inlet water pressure is higher than pump outlet pressure. Since this water pressure is sufficient to overcome the forces tending to pump brine through line 306 in the direction of the tank 230, the tank 314 is filled with fresh water flowing in a direction opposite to that in which the brine is normally urged by the pump 310.

After a certain time has elapsed for complete rinsing of the cartridge 220 in the manner set forth above, the brine tank achieves a certain liquid level by reason of water flowing thereto through line 308, and the resulting static pressure therein actuates the pressure sensitive detector 336. This then activates switch 334 and causes valves 342 and 278 to close, and deactivates solenoid 348, which causes closing of valve 298 in a manner to be described in further detail herein. At this point, rinsing water has ceased to flow into the tank 230, and since cartridge 220 has expanded upon rinsing, switch 272 is engaged and acts to close valve 330. Since flow through passage 322 and through the drain opening 332 is blocked, pressures above and below valve 286 are equalized, and the valve 286 drops by gravity to the lower or solid line position shown in FIG. 5. This then initiates flow of untreated water from passage 282 into passages 292 and 236, whence it passes through the cartridge 220 for treatment as set forth above.

Referring now to one feature of the invention, namely, valve 298, certain constructional and operational features thereof best shown in FIG. 7 will be described. Thus by reference to FIG. 7 it will be seen that the valve 298 comprises a body 352 and includes the inlet 304 for permitting brine flow to the cartridge, and an outlet 300 communicating with passage 248, shown on a different scale in FIG. 5. An upper wall portion 354 separates an interior portion 356 of the valve from an exterior portion 358 thereof. A seat 360 surmounts the wall 354 and receives thereon a diaphragm 362 having a seat 364 defining a centrally disposed opening 365 therein which is adapted to be closed by the tip 366 of a metal or like heavy needle valve unit 368.

A reduced thickness flexible skirt portion 370 of the diaphragm 362 includes an opening 372 therein of reduced diameter in respect to the opening 364 in the center part of the diaphragm 362. An electrical coil 374 surrounds the metal needle valve housing 376, thereby providing a solenoid of the type referred to herein and shown at 348 in FIG. 5. A region 378 having a large surface area is defined by the inside surfaces of the housing 376 and the upper surfaces of the diaphragm 362. The purpose of the valve 298 of the type shown in FIG. 7, as pointed out, is to permit brine to flow therethrough in the direction of the solid arrows, for example, when the solenoid is in a quiescent state, to allow water to flow in the direction shown by the broken arrows for filling the brine tank in the activated state of the solenoid, and for stopping water flow to the brine tank during normal use of the apparatus 220 with the valve in the quiescent state.

Considering that when the solenoid is deactivated, the needle valve 368 drops by its own weight, causing the tip 336 to enter seat on passage 364, and that the needle valve 368 may be raised when the solenoid is activated to open passage 364, the operation of the valve will now be described. When the pump 310 is activated, and there is no substantial back pressure in tank 230, and consequently in region 358, with seat 365 closed by tip 366, pump pressure is sufficient to raise the diaphragm 362 from its seat 360, permitting brine flow into region 358 and into the inlet 300 in the valve body 244. When the high flow rinse cycle is started by movement of valve 342, there is higher pressure at 358 than at 352. Therefore, pressure around the periphery of diaphragm 362 will tend to raise it from its seat 360 if no substantial down-acting forces are present. Raising needle valve unit 368 by activation of solenoid 348 insures that this condition will persist; since opening 372 is smaller than opening 364, any water passing through 372 will pass out by gravity through opening 364, and no water will accumulate in region 378. Under these conditions, the brine tank 314 will be refilled until pressure on detector 336 causes solenoid deactivation when needle valve 368 drops to seat 365. At this point, the diaphragm 362 is urged downwardly by the weight of the needle valve unit 368. In the meantime, water tending to flow through passage 372 fills region 378, which now has no drain outlet, since opening 364 is closed by the tip 366 of the seated needle valve 368. Accordingly, flow through the valve 298 is stopped, and water pressure in area 358, being communicated to the large top surface area of the diaphragm 362 through passage 372, keeps this valve closed. Even if the weight of valve 368 does not immediately move diaphragm 362 fully downward, water flow through opening 372 will soon fill region 378 and hydraulically seat diaphragm 362.

The use of a valve such as that described is advantageous where it is desired to permit controlled flow to the valve in either direction. Referring to the embodiments of the invention shown in FIGS. 1–5, it will be appreciated that the means for producing the various operational cycles are different in the different embodiments, but that the principle of initiating regeneration by sensing dimensional change in the cartridge is present in both.

In many cases, it has been found that it is often desirable to treat water or other fluid in two or more distinct ways within the same apparatus, and references will therefore be made to certain features of modified forms of apparatus of the invention which are advantageous for this purpose. Referring now to FIGS. 8–11, and in particular to FIG. 8, means for directing fluid flow within a fluid treating apparatus, such as the water softener of the invention wherein two or more cartridges are adapted to be used in series, are shown to be present in the form of a fluid flow director unit 380. This unit 380 includes a cylindrical tube 382 having an extent somewhat greater than the axial length of a cartridge body 384 with which it is associated and an enlarged diameter end portion 386 having seal means such as an O-ring 388 thereon, adapted to engage in fluid tight relation the inner surfaces 390 of an outlet portion of a treating tank assembly 392.

Disposed at the axial end 394 opposite the enlarged diameter end 386 are a pair of axially spaced apart discs 396, 398 with the larger diameter, upper disc 396 having a seal 398 on its outer periphery and a plurality of openings 400 on the inner margin thereof, disposed in registry with a portion of the opening 402 defined by the inwardly facing walls 404 of the cartridge body 384 which rests upon a top surface 406 of the plate 396. In the embodiment illustrated, the cartridge includes water impermeable end caps 408, and seal means 410 which are provided in association with a part of the tank 392 on one end, and on another end in the form of a seal 412, which may be attached to the cartridge end cap 408 or to the top surface 406 of the plate 396, both seals 410, 412 serving to prevent flow into the center 402 of the cartridge from the region 414 lying outwardly of the radially outer, axially extending surface 416 of the cartridge body 384. The lower plate 398 is attached at its inner margin 418 in a fluid tight relation to the tube 382 and is spaced axially apart from plate 396 by a brace 420 which is shown to include apertures 422 therein, it being understood that means must be provided for allowing fluid to pass from the opening 402 to the area 424 lying outside the outer surface 426 of a second cartridge 428. The lower portion of the cartridge 428 is engaged by a plate 430 which seals off access to the inner core 432 of the cartridge 428, with the plate 430 being urged axially upwardly as shown in FIG. 8 by springs 434. A dimension detector 436 is provided to detect axial enlargement or shrinkage of cartridge 428. Seals 438 may be provided on the end caps 440 of the cartridge 428 or on the plate 430.

The operation of the flow director unit 380 will now be described based on the assumption that the fluid to be treated is water having some contaminants which are best removed by a cartridge of one particular type, such as an activated charcoal cartridge 384, and other contaminants or hardness of a type which are best removed by a different type of cartridge, such as an ion exchange cartridge 428. In such case, it is often desired to treat the fluid, first with one cartridge, and then with the other, and accordingly, means must be provided for directing fluid radially through the first cartridge 384, thereafter through the second cartridge 428, it being further desirable that flow should be from the larger inlet surface areas on the exteriors of the cartridges for more effective treatment, and to insure that back flow during regeneration or rinsing is most effective. Accordingly, according to the invention, water entering area 414 flows radially inwardly to the body 384 of the first cartridge and is thereafter directed through apertures 400 to the area 424. Thereafter, it passes inwardly through cartridge 428 into the central opening 432 thereof, and out the tube 302 which is spaced inwardly apart from and concentrically disposed with relation to the inner surface 404 of the cartridge body 384.

In this embodiment, it is assumed that the end portion 386 is fixed in relation to a given part of the treating tank 92 and that, accordingly, there is no movement of the director unit 380, whether or not either cartridge body 384, 428 undergoes dimensional change. Therefore, although it is anticipated that this arrangement would be used with an activated carbon or other cartridge which would not undergo significant dimensional change in use, if cartridge 384 were to undergo dimensional change, the seals 410, 412 will accommodate such change by their inherent flexibility. Therefore, when used in an apparatus in which dimensional changes detected for initiating cartridge regeneration, only the change in cartridge 428 is sensed, and this occurs by reason of change in axial lengths between the plates 398 and 430.

FIG. 11 shows the director unit 380 in a perspective view without its associated cartridges or treating tank.

Referring now to FIG. 9, a flow director unit 422 is shown in which a pair of cartridges 444, 446 are spaced apart by plates 448, 450, one of which includes a seal 452 which is permitted to slide along the inner surfaces of treating tank 454 with which the unit 442 is associated in use. The inner surface 456 of cartridge 444 defines an opening 458 which communicates at one end 462 thereof with the outlet 464 for treated fluid. Springs 466 urge plate 468 axially upward and the detector 470 is adapted to detect axial dimensional change in both cartridges, since the cartridges 444, 446 are mounted for engagement only by plates which are movable.

As will be noted, the detected dimensional change is cumulative, since there is no rigid structure between ends of either cartridge except the constant space between plates 448, 450.

Referring now to FIG. 10, another flow director unit 472 is shown, in which a pair of cartridges 474 and 476 are provided, and in which an inlet 478 of the treating apparatus 480 is disposed at an opposite axial end from the outlet 482, with the result that there is no fixed mechanical connection between the upper plate 484 which engages the bottom end cap 486 of cartridge 474, and the lower plate 488 which engages the upper end cap 490 of the lower cartridge 476. A seal 492 is provided at the outer periphery of plate 484, while an opening 494 is disposed centrally thereof to provide communication into the axially extending interior opening 496 in cartridge 474. A center portion 498 of the plate 488 covers the axially directed opening 500 in the lower cartridge 476. The plates 484, 488 are held adjacent their associated cartridges by springs 502 urging the plates 484, 488 into fluid tight contact with the seals 504 which prevent radial fluid flow past the cartridges 474, 476. A dimension change detector 506 is disposed between plates 484, 488, and it will be noted that in the event both cartridges 474, 476 are of a type which undergo expansion and contraction upon change of their treating capacity, the sensitivity of the apparatus will be doubled, in relation to an apparatus in which the dimensional change of one cartridge is not sensed, since the changes in either direction occur throughout two axial lengths.

Thus, in reference to the flow directional units shown in FIGS. 8–11, embodiments are shown in which dimensional change may be detected which is a cumulative change of two or more cartridges, a change may be detected of one cartridge only, irrespective of the behavior of the other, and a construction is also shown wherein the detector is placed between a pair of cartridges each having its fixed end at an opposite end of the apparatus. In all instances, series radial inward flow is provided through two or more cartridges in the same apparatus, so that fluid passing through a second cartridge has already been fully treated by passage through a first cartridge.

Referring now to FIG. 12, an apparatus which is similar to the apparatus shown in FIG. 1 is illustrated, with slight detail differences being present therein. Bearing in mind that one object of the embodiment shown in FIG. 12 is to provide another means of removing brine accumulating in the area 508 between the movable plate 510 and the fixed bottom wall 512 of the treating tank 514, it will be noted that the stem 516 of the valve 518 which controls fluid flow into passage 520 from the reference pressure chamber 522 is not provided with a necked in or reduced diameter portion, as in FIG. 1. Instead, very small diameter plate openings 524 are provided in wall 512, and a brine drain valve 526 is provided in a lower portion of the tank wall 528. The valve 526 includes a small diameter inlet 530, a drain outlet 532, a valve seat 534 for receiving a flexible diaphragm 536 which closes off communication between the drain line 532 and a brine containing area 538 of the valve which is in communication with the inlet port 530.

Thus, with diaphragm 536 in place on seat 534, fluid may not be bled from the tank 514, whereas, within the diaphragm 536 lifted from its seat, communication, via inlet 530 and area 538, is established between the drain line 532 and the interior of the tank 514. The diaphragm 536 is normally urged closed by the presence of water supplied through line 540 to the area 542 lying above the diaphragm 536 and maintained under the reference pressure existing in chamber 522 and line 544. Bearing in mind that the operation of the units shown is the same as that of its counterpart shown in FIG. 1 except in the particulars referred to herein, and considering that the operation of the valves and the like in the valve head assembly 546 also operates in the same manner as their counterparts, the operation of the embodiment of FIG. 12 will now be described. In normal use, the land 548 on stem 516 blocks water in the chamber 522 from flowing through drain port 520. When cartridge shrinkage is sufficient to cause land 548 to open drain passage 520, pressure in chamber 522 and in line 544 is released; pressure in line 540 and in area 542 is also simultaneously released. At this point, static pressure inside tank 514 is exerted in area 548 and raises diaphragm 536, initiating flow through valve 526 of brine used in the regeneration cycle. As long as there is no substantial pressure in chamber 522, drainage through line 532 will take place.

After the bottom plate 510 has reached its maximum height, that is, upon full regeneration of the cartridge, rinsing wil commence, and since the brine is heavier than fresh water, it will tend to remain in the lower portions of the apparatus and be drained out valve 526. Furthermore, valve 526 will remain open until substantial fresh water rinsing has taken place, that is, until valve land 548 closes passage 520 and chamber 522 is allowd to fill. This time is easily sufficient to drain the remaining brine from the tank 514. Upon filling of chamber 522, pressure buildup will occur in line 540 and pressure will be exerted in area 542, causing valve 526 to close. The valve 526 will be operated at substantially the same time as the valves in the head 546 which are also controlled by pressure in line 544.

Since, in the regeneration cycle, a certain amount of brine will enter chamber 508 by reason of passage through the apertures 550 in the plate 510, some means must be provided for removing this brine, and this is the reason for the provision of drain openings 524. Since these small holes are present, the more dense salt water will normally pass therethrough into region 522, particularly when a new charge of brine is supplied to the tank 514 and valve land 548 is in the raised position. Any brine not drained during this time will eventually pass by gravity into tank 522, however, insuring that no signficant amount of salt is present in chamber 508 during normal operation. In reference to this embodiment, it will be noted that the valve 526 is somewhat similar to the valve 298 shown in FIG. 8, except that it is hydraulically biased shut rather than electromechanically and hydraulically biased shut.

Referring now To FIG. 13, it will be seen that a structure is there shown which is similar to the structure shown in FIGS. 1 and 12, that is, it includes a bottom portion 550 of a treating tank 552 in which a cartridge 554 is supported for detectable movement on plate 556. A fixed intermediate wall 558 partially defines thereabove a chamber 560 and therebelow a chamber 562. The bottom wall 564 of the tank 552 includes an opening 566 therein through which the stem 568 of the valve 570 extends. Near the center portion of the plate 556 there are a plurality of apertures 572 establishing communication between the region 574 within the center of the cartridge 554 and the chamber 560.

A check valve 576 is disposed within an opening 578 in wall 558, and flexible connector means in a form of a hose 580 extends between an opening 582 adjacent an outer edge of the plate 556 and an opening 584 in the outer margins of the intermediate wall 558. Plates 556, 558 are urged apart by a spring 586.

The operation of the part of the apparatus shown in FIG. 13 is similar to that of its counterparts shown in FIGS. 1 and 12, that is, the purpose of certain of the components is to rid the tank of excess brine settling into the low areas of the tank during regeneration, while insuring that there is little, if any, by-pass of untreated water through the system. Thus, with chamber 562 full of water at the pressure upstream of the cartridge, there will be little or no tendency for water to flow from the chamber 562 into the portion 588 of the tank 550 lying outside the cartridge body 554. On the other hand, since passage 572 establishes communication between chamber 560 and the core 574 of the filter body 554, chamber 560 has a lower pressure than does chamber 562. Fluid flow would therefore tend to pass in the direction of the core 574, if a free flow path were available. Although this would not always be harmful if the volume thereof were low, flow in such direction can be eliminated by providing the duck bill or like check valve 576, which permits fluid flow therethrough only in one direction. The hose 580 is of a length at least as great as the distance between the openings 582, 584, so that upon extreme upward movement of the plate 556, there will still be a connection established between areas 562 and 588. When the valve 570 is in the raised position so that water drains from region 562, the rinse water having brine therein can flow through the hose 580 to drain brine from the region 588. Likewise, whatever brine collects in chamber 560 will flow through valve 576 since, during this part of the cycle, there will be little if any pressure in chamber 562. On the other hand, however, during use, those areas in which there might be reverse flow are isolated from each other by one way check valves, and the areas which are connected are equal pressure areas in use, which will insure that there is no by-pass flow therethrough during that portion of the cycle. Since the openings are located in the bottoms of the respective plates 556, 558 with which they are associated, there is maximum opportunity for full drainage of the more dense brine from the treating apparatus 552 during the regeneration and rinsing cycles.

The embodiments just described illustrate that various modifications may be made to an apparatus constructed generally along the lines set forth above. The aspects of operation and function which they have in common are somewhat schematically shown by reference to the diagrammatic illustration of the operation of the invention shown in FIG. 6. allowed Thus, referring specifically to FIG. 6, a highly simplified schematic drawing of the operation of the treating apparatus of the invention is shown to illustrate those functional features the various embodiments have in common. According to the legends in FIG. 6, it may be seen that unconditioned water is present under pressure in line L, and that at a valve schematically represented at V, it may be switched to by-pass or enter the treating apparatus A. Exit is through a common outlet line O which may be supplied with conditioned water or unconditioned water, depending on the position of valve V. Passage of water through cartridge C in one direction provides conditioning thereof, schematically illustrated by solid line arrows. A reservoir R of cartridge regenerating fluid is connected by a line P to cartridge C for movement in a direction opposite to that of water being conditioned, schematically illustrated by the broken line arrows. Drain D is provided for removing used regenerating fluid. Line T provides a fresh supply of water for refilling the regenerating fluid tank and for rinsing cartridge by flow through line J, also connected to the drain line D. Valves M and N are illustrated as comprising the means for controlling the flow of water to the regenerating fluid tank T and to the cartridge C.

Thus, according to the invention, when a dimension of cartridge C is sensed, the water is by-passed as regeneration is initiated, rinsing takes place following regeneration, and passage of water to be treated through the cartridge is again initiated when the cartridge has been fully rinsed. In some embodiments, electromechanical valves are used, and in others, valves operated only by fluid flow forces present in the water are used. Different methods and sequences are provided in various different embodiments for resupplying regeneration fluid tank R with fresh water. In all cases, however, the control of the operation is accomplished by response to the changing dimensions of the treating cartridge from time to time during treatment of the fluid in question.

Referring again to an important feature of the invention mentioned above, namely, the very fine mesh particle size cartridges, one advantage thereof is that the speed of regeneration is extremely fast. Another important advantage which was not referred to in detail above, however, but which is incidental to the use of fine mesh aggregate, is that such cartridges appear able to remove from water organic material which was not previously able to be practically removed in this manner. Thus, it appears that although considerable organic matter is capable of being absorbed by ion exchange resins, the time required for significant adsorption in relation to the volume of liquid passed through an exchange bed of a given volume and having a given configuration has been very high. According to the present invention, however, the adsorption time of the cartridge has been reduced to such an extent that organic matter can actually effectively be removed from water or the like even in the time it takes for a given volume of water to pass through a radial flow cartridge having a section thickness of about one inch or less at a fairly high flow rate, that is, a flow rate commonly encountered in domestic use.

The invention herein was described with reference to treating water as the fluid in question. However, it is well known in the art that cartridges of the type referred to herein, and others having similar characteristics and uses, may be advantageously used for a number of other purposes including the following: removal of cyanide from plating baths; deionization of liquids, including removal of both cations and anions therefrom; deashing and color removal in cane sugar processing;

removal of organic impurities from various aqueous systems; molasses purification and purification of other vegetal products; removal of iron from phosphoric acid in pickling baths; removal of zinc from treating baths; removal of chromic acid from the rinse water of plating baths; removal of iron from hydrochloric acid; impurity removal during production of methanol, acetone and other ketones such as methyl ethyl ketone and the like; deashing and turbidity removal from non-aqueous systems, such as spin bath solvent systems and liquors; platinum and other precious metal removal from concentrated hydrochloric acid; removal or separation of polyols in the manufacture of glycerine; analytical uses such as protein separation and the like, including elutriation and concentration of proteins; and other processes known to those skilled in the art to be carried out or aided by the use of ion exchange systems.

It will thus be seen, by reference to the above description and to the appended claims, that the present invention provides various forms of novel fluid treating apparatuses and methods having a number of advantages and characteristics, including those pointed out herein and others which are inherent in the invention.

I claim:

1. A fluid treating apparatus, comprising: a fluid treating tank for receiving a first fluid, said tank having an inlet and outlet means, fluid treating means in said tank for providing a desired treatment to said first fluid during a service flow mode in said apparatus, said fluid treating means including at least one fluid treating cartridge which provides said desired treatment to said first fluid on demand during said service flow mode and which responds by dimensional change to a change in its treating capacity, said inlet and outlet means communicating with said fluid treating cartirdge to direct the flow of said first fluid through said cartridge, means for detecting the dimension of said cartridge to directly determine the available treating capacity thereof, means responsive to said detecting means for controlling the flow of said first fluid to said inlet means, means responsive to said detecting means for alternatively supplying a regenerating fluid to said cartridge for regeneration of the treating capacity thereof in a regeneration flow mode in said apparatus, said means for alternatively supplying regenerating fluid to said cartridge including a regenerating fluid tank, means communicating said regenerating fluid tank with said fluid treating cartridge and valve means which, during said regeneration flow mode, permits the transfer of said regenerating fluid from said regenerating fluid tank through said communicating means and then through said cartridge.

2. An apparatus as defined in claim 1 which further includes means for by-passing said first fluid around said cartridge when said regenerating fluid is be supplied to said cartridge.

3. An apparatus as defined in claim 1 in which said cartridge includes a substantial porportion of an ion exchange resin material which material produces a dimensional change on use in response to the degree to which such material becomes exhausted during such use.

4. An apparatus as defined in claim 1 in which said cartridge comprises a large proportion of an ion exchange resin material in finely divided aggregate particle form, said aggregate particles being bound in fixed relation to one another with substantially their entire surface areas freely exposed for contact with fluid passing through said cartridge.

5. An apparatus as defined in claim 1 in which said cartridge is formed from a plurality of finely divided aggregate particles of an ion exchange resin material bound together by a matrix which is elastic to an extent that dimensional variation between states in said aggregate particles produces a corresponding dimensional variation in said cartridge, said cartridge having a porous body, the interstitial volume of which is largely free from material binding said ion exchange resin material particles, whereby said finely divided material presents a large active surface area to fluid being treated with minimum pressure drop across said cartridge.

6. An apparatus as defined in claim 1 which further includes means for urging said detecting means into an engaged relation with a portion of said cartridge, and fluid flow control means for controlling the supply of said regenerating fluid to said cartridge.

7. An apparatus as defined in claim 1 which further includes means for urging said detecting means into an engaged relation with a portion of said cartridge and means for electromechanically operating said valve means.

8. An apparatus as defined in claim 1 which includes means for preventing flow of regenerating fluid to said cartridge while said first fluid is passing through said apparatus.

9. An apparatus as defined in claim 1 in which said detecting means include means for preventing detecting of said cartridge dimension when said first fluid to be treated is flowing therethrough, whereby said dimension will be detected only when said first fluid is not flowing through said cartridge.

10. An apparatus as defined in claim 1 in which said fluid treating cartridge is a cation exchange resin and in which said regenerating fluid comprises a brine solution.

11. An apparatus as defined in claim 1 in which said means for alternatively supplying said regenerating fluid to said cartridge also includes means for storing a supply of regenerating fluid and means for transferring a measured quantity of regenerating fluid to said regenerating fluid tank upon depletion of the supply thereof.

12. An apparatus as defined in claim 1 in which said detecting means includes means which respond to a pressure drop across the cartridge which is present during flow of said first fluid therethrough by moving in a direction opposite the direction of movement in which said detecting means are urged to detect a change in said dimension, whereby said detecting means is inoperative to detect said changed dimension when said first fluid is flowing through said cartridge.

13. An apparatus as defined in claim 1 in which said regenerating fluid tank of said means for supplying said regenerating fluid comprises an accumulator tank having one end thereof connected to a source of the first fluid flowing through said cartridge, and the other end thereof connected to a fluid supply line which communicates with said cartridge, and in which control means are provided which divert at least a portion of the first fluid which would otherwise pass through said cartridge to said accumulator tank to displace the contents of said accumulator tank through said fluid supply line for passage through said cartridge.

14. An apparatus as defined in claim 13 in which said control means includes a normally closed valve able to be maintained in the closed position by fluid pressure, and means for releasing said fluid pressure when said detecting means has detected a predetermined dimension of said fluid treating cartridge, thereby permitting said valve to open to cause said portion of said first fluid to displace said regenerating fluid for passage through said cartridge.

15. An apparatus as defined in claim 13 in which said control means further includes a normally closed by-pass valve held in the closed position at least partially by a fluid pressure which is released upon detection by said detecting means of said predetermined dimension of said cartridge, said by-pass valve, upon release of said pressure, moving to a position for preventing fluid flow of said first fluid through said cartridge, whereby during flow of said regenerating fluid to said cartridge, flow of said first fluid through said treating cartridge is prevented.

16. An apparatus as defined in claim 1 in which said apparatus further includes means for removing residual regenerating fluid from a region closely adjacent said cartridge after regeneration thereof by the supplying of a rinse fluid thereto, said means being responsive to a further changed dimension of said cartridge occurring after complete regeneration of the capacity of said cartridge but prior to complete rinsing of said cartridge.

17. An apparatus as defined in claim 16 in which said means for removing residual regenerating fluid includes an electromechanical switch unit which regulates a valve for introducing additional rinse fluid to said cartridge.

18. An apparatus as defined in claim 16 in which said means is in the form of a drain valve adapted to be opened by extreme movement of said detecting means, whereby regenerating fluid may be drained from the portions of the apparatus adjacent a lower portion of said cartridge.

19. A method of treating a fluid comprising passing said fluid through a cartridge which responds by dimensional change to a change in the treating capacity thereof which cartridge is adapted and arranged to provide a desired treatment to a first fluid supplied to said cartridge on demand during a service flow mode in said apparatus, detecting the dimension of said cartridge at least periodically during the time the treating capacity thereof is being depleted, and, upon detecting a predetermined degree of dimensional change therein, discontinuing flow of said first fluid to be treated therethrough, treating said cartridge with a regenerating fluid to restore the treating capacity to said cartridge, and thereafter again passing said first fluid through said cartridge for treatment thereof by said treating cartridge.

20. A method as defined in claim 19 in which said fluid to be treated is water, and in which said cartridge is a cartridge having a self-sustaining shape and comprised of an ion exchange resin material.

21. A method as defined in claim 19 which includes the step of detecting said dimension only at a time when said first fluid is not flowing through said cartridge, whereby the step of regenerating said cartridge will not be initiated while said first fluid is flowing through said cartridge.

22. A method as defined in claim 19 in which said detecting is accomplished by a mechanical movement of a portion of said detector means urged into a detecting position by resilient means, and in which forces present in said fluid flowing through said cartridge are used to initiate a regeneration cycle which includes regenerating said cartridge, and to initiate transition from said regeneration cycle to said treatment cycle.

23. A method as defined in claim 19 in which said dimension is continuously detected, and in which electromechanical means are provided to insure positive by-pass of said first fluid to be treated around said cartridge, and positive flow of regenerating fluid through said cartridge.

24. A method as defined in claim 19 which further includes detecting a further change in the dimension of said cartridge upon completion of the regeneration thereof, and responding to the detection of said condition by initiating a rinsing cycle wherein excess regenerating fluid is removed from said cartridge and said cartridge is returned to an intermediate dimension, and detecting said intermediate dimension and responding thereto by again initiating said treating cycle.

25. A method of treating fluid which is intermittently passed through a cartridge which cartridge is adapted and arranged to provide a desired treatment to a first fluid supplied to said cartridge on demand during a service flow mode in said apparatus, said method including the steps of intermittently passing a first fluid through said cartridge, detecting the dimension of said cartridge which dimension is indicative of the treatment capacity of said cartridge from time to time, only during a period when fluid is not flowing through said cartridge, and, upon detecting a dimensional change of a predetermined extent, preventing further flow of said first fluid through said cartridge and treating said cartridge by flow therethrough of a regeneration fluid prior to permitting further flow of said first fluid to be treated through said regenerated cartridge.

26. In the method of operating a fluid treating apparatus which includes treating a first fluid by exposure to a treating cartridge containing active aggregate particles and which responds by dimensional change to change in its treating capacity, which cartridge is adapted and arranged to provide a desired treatment to a first fluid supplied to said cartridge on demand during a service flow mode in said apparatus, and periodically treating said cartridge with a regenerating solution, following which the service mode of fluid treatment is carried out until regeneration is again desired, the improvement comprising sensing dimensional change of said cartridge to ascertain when regeneration of said cartridge is required, and utilizing fluid flow forces present during treatment of said first fluid to prevent sensing a dimension of said dimensionally responsive cartridge during periods of flow of said first fluid through said cartridge, whereby said dimension may be sensed only during periods wherein said first fluid is not flowing through said cartridge for treatment.

27. An apparatus for treating fluids, comprising a fluid treating tank for receiving a first fluid, said tank having an inlet and outlet means, fluid treating means in said tank for providing a desired treatment to said first fluid during one operational mode in said apparatus, said fluid treating means including at least one fluid treating cartridge which provides said desired treatment to said first fluid on demand during said one operational mode and which responds by dimensional change to a change in its treating capacity, said inlet and outlet means communicating with said fluid treating cartridge to direct the flow of said first fluid through said cartridge, means for detecting the dimension of said cartridge to directly determine the available treating capacity thereof, said means for detecting the dimension of said cartridge including a cartridge dimension detector assembly which includes means for engaging one surface of said cartridge and bias means urging a portion of said assembly against said cartridge so as to detect dimensional changes therein by movement between condition-detecting positions in response to such changed dimension, means responsive to said detecting means for controlling the flow of said first fluid to said inlet means, means responsive to said detecting means for alternatively supplying a regenerating fluid to said cartridge for regeneration of the treating capacity thereof in another operational mode in said apparatus, said means for alternatively supplying regenerating fluid to said cartridge including a regenerating fluid tank, means communicating said regenerating fluid tank with said fluid treating cartridge and valve means which, during said other operational mode of apparatus, permits the transfer of said regenerating fluid from said regenerating fluid tank through said communicating means and then through said cartridge, whereby said first fluid to be treated will pass through said fluid treating cartridge in response to one of said positions of said means for detecting the dimension of said cartridge and regenerating fluid will be supplied to said fluid treating cartridge in response to another of said positions of said means for detecting the dimension of said cartridge.

28. An apparatus for treating fluids as defined in claim 27 which includes means communicating a supply of untreated rinsing water to said cartridge, and valve means connected to said rinse water communicating means which permits the flow of untreated rinse water through said rinse water communicating means and to said cartridge after regeneration thereof.

29. An apparatus for treating fluids as defined in claim 27 in which said regenerating fluid is supplied to said tank for flow through said cartridge in a direction opposite to the direction of the flow of said first fluid during fluid treatment thereof, whereby said cartridge may be cleaned of particles trapped on the upstream side of said treating cartridge.

30. An apparatus for treating fluids as defined in claim 27 in which said detector includes a control element attached thereto and extending outwardly through a portion of said tank, said control element being connected to an electromechanical circuit for selectively actuating said means for controlling the flow of said first fluid to said inlet means and means for alternatively supplying a regenerating fluid to said cartridge.

31. An apparatus for treating fluids as defined in claim 27 in which said detector includes a control element attached thereto and extending outwardly through a portion of said tank, said control element being movable in response to dimensional changes in said cartridge to occupy a series of positions, said means for controlling the flow of said first fluid to said inlet means being responsive to one position of said controlling element, said means for alternatively supplying a regenerating fluid to said cartridge being responsive to another position of said control element, whereby, in one position of said control element, said apparatus is in said one operational mode in which said first fluid is treated, and in another position of said control element, said apparatus is in another mode in which regenerating fluid is supplied to said cartridge.

32. An apparatus for treating fluids as defined in claim 30 in which said control element actuates a mechanism for draining accumulated treating fluid from said treating tank after said cartridge has been treated with said fluid.

33. A fluid flow director assembly adapted to receive at least first and second fluid-treating cartridges for fluid treatment by radial flow from the radially outer, axially extending surfaces thereof through the bodies of said cartridges to axially extending, inner core openings in said bodies defined by the radially inwardly facing surfaces thereof, said assembly including when said cartridges are received therein means for preventing fluid flow into said inner opening in said first cartridge from at least one axial end thereof, means for preventing fluid flow into said opening in said second cartridge from at least one axial end thereof, and means for directing flow from said opening in said first cartridge to an area lying outwardly of said radially outer, axially extending surface of said second cartridge, whereby fluid flowing under pressure in an apparatus having said flow director assembly therein will flow radially inwardly through said first cartridge and thereafter radially inwardly through said second cartridge.

34. An assembly as defined in claim 33 which further includes means for directing the flow of said fluid flowing into said opening in said second cartridge axially through the opening in said first cartridge while preventing commingling of said fluid in said first and second openings.

35. An assembly as defined in claim 33 in which said means for preventing fluid flow into said openings comprises a pair of axially spaced apart plates, one of said plates being adapted to engage an associated treating tank on an inner surface thereof in fluid tight relation and having at least one opening adapted to register with said opening in said first cartridge, and said other plate including means therein for locating said second plate in relation to said first plate.

36. An assembly as defined in claim 33 which further includes means for engaging an element adapted to detect a dimensional change in at least one of said cartridges in relation to a fixed part of said assembly associated with said flow director assembly.

37. An assembly as defined in claim 33 which said means for preventing fluid flow into said opening in said first cartridge and said means for preventing fluid flow into said opening in said second cartridge are urged into engagement by resilient means disposed therebetween, and in which means are provided for detecting relative movement between said means which is permitted by dimensional change of said cartridge.

38. An assembly as defined in claim 33 which further includes means for preventing fluid flow into at least one of said cartridges from at least a major portion of at least one axial end surface of one of said cartridges.

39. A flow director unit adapted to receive at least first and second fluid treating cartridges each having an axially extending core therein defined by radially inwardly facing surfaces, said apparatus comprising a cylindrical, fluid impermeable, tube adapted to extend through one of said cartridges when said first and second cartridges are received in said flow director unit, said fluid impermeable tube being of reduced diameter throughout substantially its entire length, and having one end thereof adapted for reception in the outlet portion of a fluid treating apparatus with which said flow director unit is associated, a first plate disposed opposite the other end of said tube, extending radially outwardly therefrom, and being attached thereto in fluid impermeable relation, said first plate including an opening therein in registry with the interior of said cylindrical tube, a second plate disposed between said one end and said first plate and spaced axially apart therefrom, and means in said second plate in registry with said opening in said first cartridge for directing fluid from said opening to the region between said first and second plates, whereby fluid passing through said first cartridge into the core thereof is directed to the outer surface of said second cartridge, and fluid passing outwardly of the core of said second cartridge moves axially through said tube within said first cartridge.

* * * * *

UNITED STATES PATENT OFFICE
CERTIFICATE OF CORRECTION

Patent No. 3,831,754          Dated August 27, 1974

Inventor(s) Don Edward Heskett

It is certified that error appears in the above-identified patent and that said Letters Patent are hereby corrected as shown below:

Column 2, line 23, "thes" should read --these--
Column 2, line 63, "wpaced" should read --spaced--
Column 5, line 6, "proportion" should read --more--
Column 5, line 11, "cartriges" should read --cartridges--
Column 7, line 34, "mewh" should read --mesh--
Column 20, line 61, "422" should read --442--
Column 22, line 32, "wil" should read --will--
Column 22, line 38, "allowd" should read --allowed--

Column 23, line 62, delete "allowed"

Signed and sealed this 3rd day of June 1975.

(SEAL)
Attest:

RUTH C. MASON
Attesting Officer

C. MARSHALL DANN
Commissioner of Patents
and Trademarks